(12) United States Patent
Reshidko et al.

(10) Patent No.: US 8,508,649 B2
(45) Date of Patent: Aug. 13, 2013

(54) COMPACT DISTORTED ZOOM LENS FOR SMALL ANGLE OF VIEW

(75) Inventors: Pavel Reshidko, Tel-Aviv (IL); Gal Shabtay, Tel-Aviv (IL); Ephraim Goldenberg, Tel-Aviv (IL)

(73) Assignee: DigitalOptics Corporation Europe Limited, Galway (IE)

( * ) Notice: Subject to any disclaimer, the term of this patent is extended or adjusted under 35 U.S.C. 154(b) by 346 days.

(21) Appl. No.: 13/026,937

(22) Filed: Feb. 14, 2011

(65) Prior Publication Data

US 2012/0206627 A1    Aug. 16, 2012

(51) Int. Cl.
G03B 13/00    (2006.01)
G03B 17/00    (2006.01)
G02B 15/14    (2006.01)

(52) U.S. Cl.
USPC ............................. 348/345; 359/696; 396/79

(58) Field of Classification Search
USPC .................. 348/345–356, 240.2; 396/79–83, 396/89–152; 359/696, 698; 382/255
See application file for complete search history.

(56) References Cited

U.S. PATENT DOCUMENTS

| | | | | |
|---|---|---|---|---|
| 8,169,533 B2* | 5/2012 | Sakamoto | ..................... | 348/345 |
| 2003/0011895 A1* | 1/2003 | Mori | ............................. | 359/749 |
| 2011/0194016 A1* | 8/2011 | Noda | ............................ | 348/345 |
| 2011/0285896 A1* | 11/2011 | Mihara | ........................ | 348/345 |
| 2012/0038816 A1* | 2/2012 | Yamano | ........................ | 348/345 |

* cited by examiner

*Primary Examiner* — Aung S Moe
*Assistant Examiner* — Mekonnen Dagnew
(74) *Attorney, Agent, or Firm* — Turocy & Watson, LLP; Vinay Joshi

(57) ABSTRACT

Providing for optical imaging lenses employing non-linear distortion for image magnification is described herein. By way of example, a five-lens system can perform magnification functions by producing distortion that expands the image in the center of the field of view and compresses the image in the periphery of the field of view. This distortion can be corrected through image processing to yield a rectified image. Further, the five-lens system can be implemented as part of a fixed-focus imaging system, or in conjunction with a variable focus optical magnification imaging system.

44 Claims, 21 Drawing Sheets

GRID DISTORTION

COMPACT DISTORTED ZOOM LENS FOR SMALL ANGLE OF VIEW

FIELD OF THE INVENTION

The following relates generally to imaging optics, and more specifically to a system that distorts a projection and corrects the distortion using image processing.

BACKGROUND

In recent years, the size and manufacturing cost of cameras have decreased dramatically. Modern devices are ultra-portable, allowing their incorporation into other systems such as cellular telephones and other multifunction devices. Consumers today can maintain near continuous access to cameras during daily routines without the effort of carrying a standalone system.

Despite these advances, cameras integrated into other mobile devices often lack the functionality of full-featured digital and film cameras. Zoom capability is one aspect in which the disparity is apparent between integrated devices and standalone cameras. Camera zooming apparatuses are often ill-suited to integration into portable equipment, as zoom function can require moving parts assemblies that are expensive, delicate and bulky. Therefore, it would be desirable to develop imaging zoom lenses that do not suffer from these drawbacks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one or more aspects, the subject disclosure provides a distorted zoom lens for use in an electronic device, miniature surveillance equipment, or the like. An image generated by the zoom lens can be expanded in the center of the field of view and compressed in the periphery, resulting in intentional distortion of the object information. This distortion is then corrected by image processing to produce a rectified image while allowing greater magnification at the center of the image.

In one aspect, the subject disclosure provides a distorted zoom lens comprising five lenses. In another aspect, the five lenses are divided into two lens groups, wherein at least one of the lens groups is moved along an optical axis with respect to at least another of the lens groups to focus the distorted zoom lens. In yet another aspect, an image sensor is moved in conjunction with one of the lens groups relative to a second of the lens groups.

In additional aspects, the distorted zoom lens can have a small field of view. Particularly, in one aspect, the field of view can have a half angle between 30 and 35 degrees. Furthermore, in another aspect, the field of view can have a half angle between 35 and 40 degrees. In still another aspect, the distorted zoom lens can have a compact arrangement. For instance, the distorted zoom lens can have a total track length of less than 10.5 millimeters. In another aspect, the distorted zoom lens can have a total track length of less than 7 millimeters.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
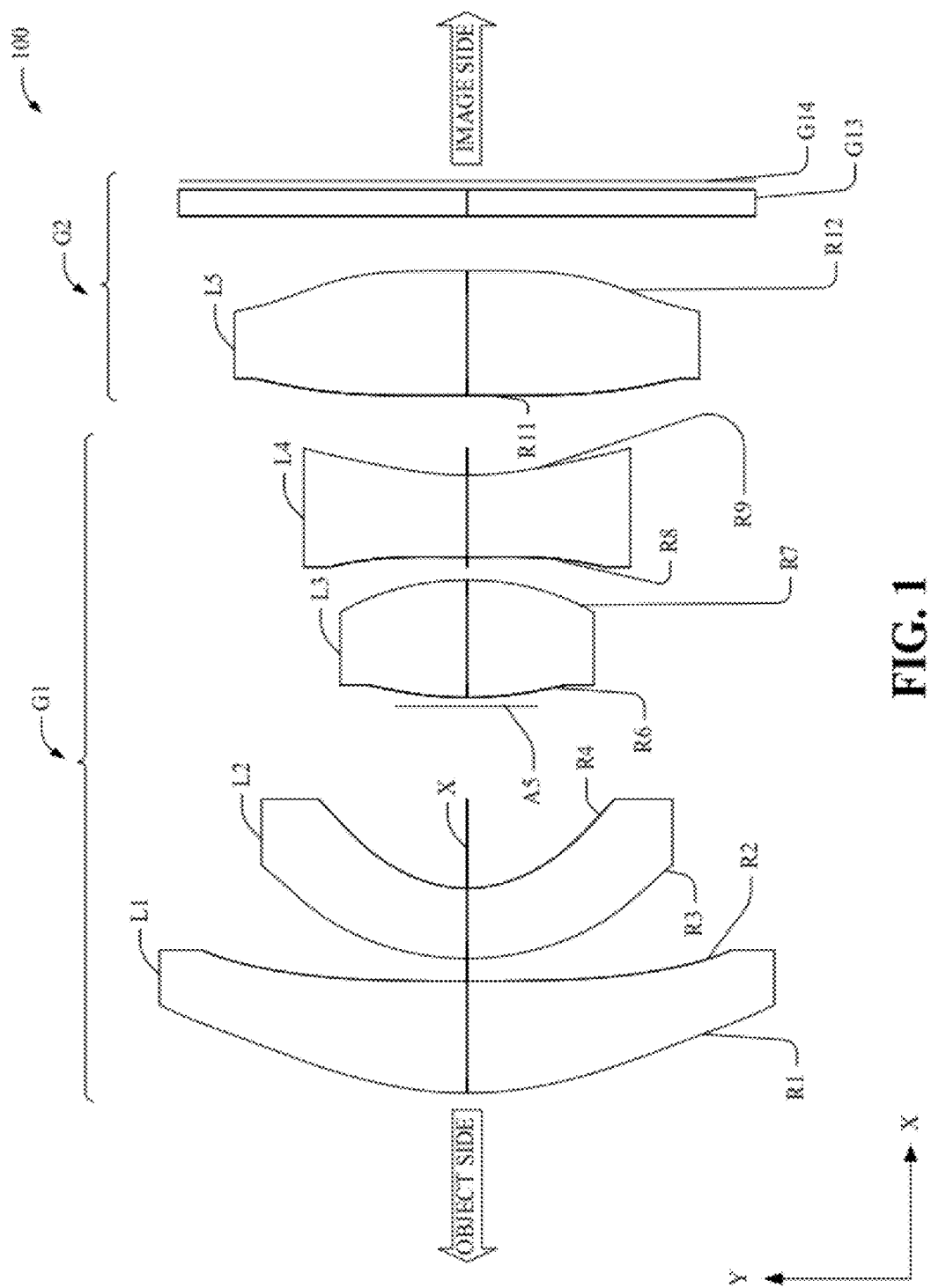
FIG. 1 depicts a block diagram of an example optical imaging system representative of various aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It will be evident, however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that the specific structures or functions disclosed herein are merely representative. Based on the teachings herein one skilled in the art should appreciate that the disclosed aspects can be implemented independently of other aspects, and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the apparatuses and lens systems disclosed herein are described in the context of providing high resolution optical imaging via compact optical lens arrangements. One skilled in the art should appreciate that similar techniques could apply a variety of optical lens architectures. For example, the lens arrangements used herein may be used in mechanical focus or auto-focus systems whereby the optical arrangement is automatically or manually displaced relative to the image plane.

One or more embodiments describe a fixed-zoom imaging lens. The fixed-zoom imaging lens can obtain a zoom effect without moving parts, by distorting a projection of the object in such a way that the projected image can be expanded in a central region of the field of view, and can be compressed in a peripheral region of the field of view. The distortion can result in variable image magnification across a sensor. In an embodiment, the distortion can increase with the distance from the optical axis, enabling the projection to be zoomed. Digital image restoration can be utilized to correct the intentional distortion of the captured image. In this way, resolution can be improved as compared to standard imaging lenses. In an embodiment, the fixed-zoom imaging lens can have a small angle of view.

In another embodiment, the imaging lens can be a zoom lens having two lens groups. At least one of the lens groups can be moved along an optical axis to focus an image projected by the imaging lens. The zoom imaging lens can also employ distortion and digital image restoration described above and elsewhere herein to improve magnification of the zoom imaging lens.

As utilized herein, an optical element refers to a single piece of refractive or reflective material at least partially transparent to electromagnetic radiation at least partially within the visible spectrum (e.g., including wavelengths approximately 400 to 700 nanometers [nm]). Examples of suitable material include ground and polished glass, molded glass or glass formed from a replication molding process, weight to level optics (WLO), injection-molded plastic, etched micro optics formed on an optical substrate, or the like. Additionally, an optical element will have at least one refractive or reflective surface. One example of an optical element utilized herein is an optical lens. An optical lens is an optical element comprising two opposing refractive surfaces, and an edge between the opposing surfaces that defines an outer diameter (for a circular lens) or perimeter of the lens, and an edge thickness of the lens. A typical arrangement of optical lenses includes a series of lenses at least generally transverse to an optical axis 104. It should be appreciated, however, that other possible arrangements can exist consistent with the subject disclosure. A "lens component" is defined herein as (A) a single lens element spaced so far from any adjacent lens element that the spacing cannot be neglected in computing the image forming properties of the respective lens elements, or (B) two or more lens elements that have adjacent lens surfaces either in full overall contact or so close together that any spacing between the adjacent lens surfaces are so small that the spacing(s) can be neglected in computing image forming properties of the two or more lens elements. Thus, some lens elements can also be lens components, and the terms "lens element" and "lens component" are not mutually exclusive terms. In addition, it should be appreciated that the term "optical component" is utilized herein to refer to a superset of items having significant properties related to imaging optical systems, and includes optical elements such as lens elements and lens components, as well as optical stops, but can also include various other items such as a thin film, a bandpass filter, a lowpass or highpass filter, a polarizing filter, a mirror, etc.

Referring now to the drawings, FIG. 1 depicts a cross-sectional block diagram of an example imaging lens 100 according to aspects of the subject disclosure. In an embodiment, imaging lens 100 includes a group zoom lens that can include five lens elements. As depicted in the present embodiment, imaging lens 100 comprises an arrangement of lenses including lens L1, lens L2, lens L3, lens L4 and lens L5, ordered from the object side to the image side in a like manner relative to an optical axis X. Lens L1, lens L2, lens L3, lens L4 and lens L5 each have two surfaces each, and these surfaces have respective radii of curvature, denoted (from object side to image side) R1 and R2 for lens L1, R3 and R4 for lens L2, R6 and R7 for lens L3, R8 and R9 for lens L4, and R11 and R12 for lens L5. It is possible to have lens surfaces that are concave, convex, or various combinations thereof for one or more of the lenses included in an embodiment of imaging lens 100. In at least one embodiment, each lens element can be comprised of a particular material, and different subsets of the lens elements of imaging lens 100 can be composed of a single material, or of different materials. Each lens surface can also have a refractive index (not labeled in FIG. 1), denoted N1 and N2 for lens L1, N3 and N4 for lens L2, N6 and N7 for lens L3, N8 and N9 for lens L4, and N10 and N11 for lens L5 hereafter. In addition, lens elements comprising different materials can have different Abbe numbers. Further details relating to refractive indices N1-N11, Abbe numbers, and other aspects of at least one embodiment of imaging lens 100 are provided in Tables 1-4, infra. Imaging lens 100 can also include aperture stop A5. In an embodiment, aperture stop A5 is located between lens L2 and lens L3. While this arrangement is typical for at least one embodiment, it should be appreciated that other possible arrangements and structures can exist consistent with the features and goals described herein.

Imaging lens 100 can also comprise a sensor $G_{14}$ that can be a digital device comprising a multi-dimensional array (e.g., a two dimensional array) of electro-optical sensors, or pixels. Examples of such a device can include a charge-coupled device (CCD) array, or a complementary metal-oxide semiconductor (CMOS) array, or some other suitable array of optical sensors. Each electro-optical sensor, or pixel, of such array is configured to output an electric signal when irradiated with light. Furthermore, an amount of electric current for the electric signal is directly related to energy density of light irradiating the pixel. Accordingly, by collecting output current levels from each pixel of the array, sensor $G_{14}$ can digitally reproduce a two dimensional radiant energy pattern of light irradiating the sensor $G_{14}$. Additionally, where the pixel surface or sensor plane of sensor $G_{14}$ is placed at the above-mentioned ID, the two dimensional radiant energy pattern that is produced is that of a real optical image generated by imaging lens 100. Accordingly, sensor $G_{14}$ can be utilized to digitally reproduce that image.

Resolution of a digital image generated by sensor $G_{14}$ depends on a number of pixels within the sensor plane array, which in turn is dependent on pixel area and total array area. Thus, for example, for relatively square pixels approximately 1.4 microns per side (1.96 square microns), a 0.4 cm square sensor array can comprise approximately 8 megapixels (Mp). Said differently, such a sensor would have resolution of about 8 Mp. It should be appreciated, however, that the subject disclosure is not limited to these example dimensions.

Because the pixel array of sensor $G_{14}$ generates an electronic reproduction of a real image, data generated by sensor 106 in the form of electric signals can be saved to memory, projected to a display for viewing (e.g., digital display screen), edited in software, and so on. Thus, at least one application of optical system 100 is in conjunction with a digital camera or video camera comprising a digital display. Furthermore, imaging lens 100 and other optical systems included in the subject disclosure can be implemented in conjunction with a camera module of an electronic device (not depicted). Such an electronic device can include a wide array of consumer, commercial or industrial devices. Examples include consumer electronics, including a cell phone, smart phone, laptop computer, net-book, PDA, computer monitor, television, flat-screen television, and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, etc.), or industrial surveillance equipment (e.g., airfield cameras, freight yard cameras, rail yard camera, and so on). For instance in consumer electronics, because imaging lens 100 can comprise optical components having physical dimensions on the order of a few millimeters or less, and because at least some lens elements of imaging lens 100 can have a fixed position, imaging lens 100 and other disclosed systems are well suited for various types of mini or micro camera modules. It is to be appreciated, however, that the disclosed systems are not limited to this particular application; rather, other applications known to those of skill in the art or made known by way of the context provided herein, are included within the scope of the subject disclosure.

In an embodiment of imaging lens 100, lens L1 can have a positive refractive power and a meniscus shape, where surfaces R1 and R2 can be respectively convex and concave. Lens L1 can be large in comparison to the other lenses of imaging lens 100. Lens L1 can also have a center-to-edge thickness that is larger than that commonly applied in conventional lenses and in comparison to lens L2, lens L3 and lens L4. In an embodiment R2 can additionally be convex near the optical axis. Lens L2 can have a negative refractive power and a meniscus shape, where surfaces R3 and R4 can be respectively convex and concave. Lens L2 can also have a comparatively small radius of curvature. Lens L3 can have a positive refractive power, and in at least one embodiment. Surfaces R6 and R7 can be convex. In an embodiment, L3 can have a small negative refractive power. L4 can have a negative refractive power. Surface R8 can be convex, and surface R9 can be concave. In an embodiment, lens L4 can have a small positive refractive power. In an embodiment, lens L4 can have a varying power that can be negative at its vertex and increasingly positive with radial distance from the vertex. In one embodiment, lens L5 can have a negative refractive power, and surface R11 and R12 can be respectively concave and convex. In an embodiment, lens L5 can have a small positive refractive power. In an embodiment, lens L5 can have a varying power that can be negative at its vertex and increasingly positive with radial distance from the vertex. Lens L5 can also have a center-to-edge thickness that is larger than that commonly applied in conventional lenses and in comparison to lens L2, lens L3 and lens L4. In an embodiment, at least one surface of lens L1, lens L2, lens L3, lens L4 and lens L5 has an aspheric shape, although other embodiments in accordance with the disclosures herein are possible. In an embodiment, both surfaces of lens L1, lens L2, lens L3, lens L4 and lens L5 can be aspheric, which can facilitate a relatively bright image and simpler aberration correction. Aspheric lenses can be defined by the following equation:

$$Z = \frac{C^2 Y}{1 + \sqrt[2]{(1 - (1+K)C^2 Y^2) + \sum_i A_i Y^i}}$$

where Z is the length (in mm) of a line drawn from a point on the aspheric lens surface at a distance Y from the optical axis to the tangential plane of the aspheric surface vertex, C is the curvature of the aspheric lens surface on the optical axis, Y is the distance (in mm) from the optical axis, K is the conic constant, $A_i$ is the $i^{th}$ aspheric coefficient, and the summation extends over even number i.

In an embodiment, one or more of lens L1, lens L2, lens L3, lens L4 and lens L5 can be made of plastic. In an embodiment, lens L2 and lens L4 can both be made of a common plastic material. In an embodiment, lens L3 and lens L5 can both be made of a second plastic material (different from that of lens L2 and lens L4).

Lenses within imaging lens 100 can exist within or be arranged according to lens groups. A lens group can be an assembly of one or more lens elements in optical series that move in concert (i.e., as a single unit) relative to another component (e.g., another lens group) along an optical axis during a zoom function. In the embodiment depicted in FIG. 1, imaging lens 100 includes lens group G1 and lens group G2, with lens group G1 on the object side and lens group G2 on the image side. Lens group G1 includes lens L1, lens L2, lens L3, lens L4 and lens L5. In an embodiment, a lens group can include elements other than a lens. In an example, a lens group can include a stop that controls an amount of light that passes through a lens group. As shown in FIG. 1, lens group G1 includes aperture stop A5. In an embodiment, lens group G1 can have a negative optical power, and lens group G2 can have a positive optical power. In a more specific embodiment, three lenses—lens L1 and lens L3 of lens group G1, and lens L5 of lens group G2—can have a positive power; and lens L2 and lens L4 of lens group G1 can have a negative power.

When focusing an optical system including imaging lens 100, lens group G1 and lens group G2 can move with respect to sensor G13, one another, or both. For example, in one embodiment, lens group G1 and lens group G2 can remain at a fixed inter-distance but move together relative to the position of sensor G13. In another embodiment, lens group G2 and sensor G13 can move together with respect to lens group G1. In still another embodiment, lens group G2 can move independently with respect to lens group G1.

Lens group G1 and lens group G2 can move in the ways described above (or others) to create or alter distortion that facilitates magnification. While the distortion is described in terms of moving lens groups, it is possible that non-moving lenses or lens groups can produce similar distortion or other phenomenon applicable to the techniques set forth in this application, and description of lens group motion is in no way intended to exclude embodiments in which the lenses or lens groups are immobile or fixed. In at least one embodiment, information received from the object is transformed into distorted information on sensor G13. The distorted information on the sensor can be magnified to comport with a desired zoom level or otherwise. The image can be represented using, for example, a two dimensional coordinate system (e.g. Cartesian coordinate system) including two perpendicular axes on a plane. Objects, projections of objects, and images can all be represented according to such a coordinate system, although no need necessarily be represented according to the same, or different, coordinate systems. In an embodiment, an image coordinate can be described by point (u,v) with respect to object coordinates (x,y) according to the following:

$$u = x \times \frac{f(r)}{r}; v = y \times \frac{f(r)}{r}$$

where r is the radius from optical axis X and $f$ is a function representing the radial distortion introduced by the lens. Further, r can be described by:

$$r = \sqrt[2]{x^2 + y^2}$$

With respect to optical systems described herein, a lens can be comprised of (but is not limited to) an element spaced so far from any adjacent lens element that the spacing cannot be neglected in computing the image forming properties of the respective lens elements, or two or more elements that have adjacent lens surfaces either in full overall contact or so close together that any spacing between the adjacent lens surfaces are so small that the spacing(s) can be neglected in computing image forming properties of the two or more lens elements. In addition, it should be appreciated that an optical component or element can refer to (but is not limited to) a superset of items having significant properties related to imaging optical systems, and includes lens components, as well as optical stops, but can also include various other items such as a thin film, a bandpass filter, a lowpass or highpass filter, a polarizing filter, a mirror, et cetera. Lens elements can be combined in a variety of ways, including adhesives, chemical bonding, mechanical fixtures, and others. In one or more embodiments, different lens elements can be in direct contact, or separated by a material (e.g., optical interface fluid, glass, other optical substrate) of substantially uniform refractivity.

Sensor G13 can be a digital device comprising a multi-dimensional array (e.g., a two dimensional array) of electro-optical sensors, or pixels. Examples of such a device can include a charge-coupled device (CCD) array, or a complementary metal-oxide semiconductor (CMOS) array, or the like. Each electro-optical sensor, or pixel, of such array is configured to output an electric signal when irradiated with light. Furthermore, an amount of electric current for the electric signal is directly related to energy density of light irradiating the pixel. Accordingly, by collecting output current levels from each pixel of the array, sensor G13 can digitally reproduce a two dimensional radiant energy pattern of light irradiating the sensor G13. Additionally, where the pixel surface or sensor plane G14 of sensor G13 is placed at an image distance, the two dimensional radiant energy pattern that is produced is that of a real optical image generated by optical elements of imaging lens 100. Accordingly, sensor G13 can be utilized to digitally reproduce that image. In at least one embodiment, sensor G13 can be an 8 megapixel (Mp) sensor with a 1.4 micrometer (μm) pixel size and an F-number of 3.2.

Resolution of a digital image generated by sensor G13 depends on a number of pixels within the sensor plane array G14, which in turn is dependent on pixel area and total array area. Thus, for example, for relatively square pixels approximately 1.4 microns per side (1.96 square microns), a 0.4 cm square sensor array can comprise as many as 8.1 megapixels. Said differently, such a sensor would have resolution of about 8 Mp. Because the pixel array generates an electronic reproduction of a real image, data generated by sensor G13 in the form of electric signals can be saved to memory, projected to a display for viewing (e.g., digital display screen), edited in software, and so on. Thus, at least one application of imaging lens 100 is in conjunction with a digital camera or video camera comprising a digital display (not depicted). Furthermore, imaging lens 100 and other optical systems included in the subject disclosure can be implemented in conjunction with a camera module of an electronic device. Such an electronic device can include a wide array of consumer, commercial or industrial devices. Examples include consumer electronics, including a cell phone, smart phone, laptop computer, net-book, PDA, computer monitor, television, flat-screen television, and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, et cetera), or industrial surveillance equipment (e.g., airfield cameras, freight yard cameras, rail yard camera, and so on). For instance in consumer electronics, because optical elements can comprise elements having fixed positions relative other elements, and having either static or dynamic position along the optical axis X, imaging lens 100 and other disclosed systems are well suited for various types of mini or micro camera modules. It is to be appreciated, however, that the disclosed systems are not limited to this or any other particular application described herein or elsewhere; rather, other applications known to those of skill in the art or made known by way of the context provided herein, are included within the scope of the subject disclosure.

Generally, an optical element (e.g., lens element) can be a single piece of refractive or reflective material at least partially transparent to electromagnetic radiation at least within the visible spectrum (e.g., approximately 400 to 700 nanometers). The surfaces of an optical element can be positioned at least generally transversely to the optical axis of the imaging lens. Examples of suitable material include ground and polished glass, molded glass or replication molding process, weight to level optics (WLO), injection-molded plastic, etched micro optics, or the like. Additionally, an optical element will have at least one refractive or reflective surface. One example of an optical element utilized herein is an optical lens. An optical lens is an optical element comprising two opposing refractive surfaces, and an edge between the opposing surfaces that defines an outer diameter (for a circular lens) or perimeter of the lens. In the depicted embodiment, the lenses can be a single, transparent mass of refractive material with two opposing refractive surfaces. The refractive surfaces can have different refractive indices and can be made from different dispersive materials or media. The two refractive surfaces can be separated by a glass plate or other material including appropriate optical surfaces.

While the embodiment(s) described above provide particular details, it will be appreciated by those skilled in the art that an imaging lens of this function is not limited to a single embodiment, and alternative implementations are possible. For example, the radius of curvature, surface spacing, refractive indices and Abbe numbers of elements are not limited to those described either above with regard to FIG. 1 or below as specified in the tables. Further, embodiments using a single lens group or more than two lens groups are envisioned in at least some aspects of the subject disclosure, and embodiments employing an alternative number of lenses or elements can be employed for other aspects.

Tables 1-4 included infra provide further details on the depicted embodiment of imaging lens 100 and others. Tables 1-4 are intended to provide further details relating to one or more embodiments of the disclosure herein. In some instances, rows or columns of the same table may be split by line or page breaks in order to facilitate compact presentation. The optical properties of Tables 1-4 are defined in ZEMAX Optical Design Software, available from ZEMAX Development Corporation. General lens information is provided in Table 1. Note that vignette factors were set to 0.0 at all field angles for the optical system of imaging lens 100. Table 2 lists surfaces from object side to image side, the radius of curvature (in mm) of each surface near the optical axis. The thickness value of Table 2 represents on-axis spacing between optical surfaces.

TABLE 1

Example General Lens Data For Imaging Lens 100

| | |
|---|---|
| Surfaces: | 15 |
| Stop: | 5 |
| System Aperture: | Image Space F/# = 3.1 |
| Ray Aiming: | Paraxial Reference, Cache On |
| X Pupil Shift: | 0 |
| Y Pupil Shift: | 0 |
| Z Pupil Shift: | 0 |
| X Pupil compress: | 0 |
| Y Pupil compress: | 0 |
| Apodization: | Uniform factor = 0.00E+00 |
| Temperature (C.): | 2.30E+01 |
| Pressure (ATM): | 1.00E+00 |
| Adjust Index Data to Environment: | On |
| Effective Focal Length: | 6.646136 |
| Effective Focal Length: | 6.646136 |
| | (in image space) |
| Back Focal Length: | 1.00 |
| Total Track: | 10.39301 |
| Image Space F/#: | 3.1 |
| Paraxial Working F/#: | 3.134344 |
| Working F/#: | 3.201539 |
| Image Space NA: | 0.1575312 |
| Object Space NA: | 0.001064898 |
| Stop Radius: | 0.7363414 |
| Paraxial Image Height: | 4.363867 |
| Paraxial Magnification: | −0.006675514 |
| Entrance Pupil Diameter: | 2.143915 |
| Entrance Pupil Position: | 6.629025 |
| Exit Pupil Diameter: | 1.291831 |
| Exit Pupil Position: | −4.08442 |
| Field Type: | Angle in degrees |
| Maximum Radial Field: | 33 |
| Primary Wavelength: | 0.546 μm |
| Lens Units: | Millimeters |
| Angular Magnification: | 1.659594 |

Field Angles

| Field Type: | Angle in degrees | | |
|---|---|---|---|
| # | X-Value | Y-Value | Weight |
| 1 | 0.000000 | 0.000000 | 1.000000 |
| 2 | 0.000000 | 3.000000 | 1.000000 |
| 3 | 0.000000 | 5.050000 | 1.000000 |
| 4 | 0.000000 | 8.400000 | 1.000000 |
| 5 | 0.000000 | 10.000000 | 1.000000 |
| 6 | 0.000000 | 13.300000 | 1.000000 |
| 7 | 0.000000 | 16.200000 | 1.000000 |
| 8 | 0.000000 | 19.170000 | 1.000000 |
| 9 | 0.000000 | 23.040000 | 1.000000 |
| 10 | 0.000000 | 27.600000 | 1.000000 |
| 11 | 0.000000 | 30.000000 | 1.000000 |
| 12 | 0.000000 | 33.000000 | 1.000000 |

Wavelength Data

| Units: | μm | |
|---|---|---|
| # | Value | Weight |
| 1 | 0.420000 | 26.000000 |
| 2 | 0.486000 | 163.000000 |
| 3 | 0.546000 | 324.000000 |
| 4 | 0.588000 | 330.000000 |
| 5 | 0.656000 | 157.000000 |

TABLE 2

Example Surface Data for Imaging Lens 100

| Surf | Type | Radius | Thickness | Diameter | Conic | Comment |
|---|---|---|---|---|---|---|
| OBJ | Standard | Infinity | 1000 | 1307.425 | 0 | |
| R1 | EvenAsphere | 3.667645 | 1.275 | 6.4 | −2.45 | L1-1 |
| R2 | EvenAsphere | 59.65 | 0.258 | 5.5 | 0 | L1-2 |
| R3 | EvenAsphere | 2.570775 | 0.8 | 4.28 | −1.01 | L2-1 |
| R4 | EvenAsphere | 1.209316 | 2.073408 | 3.08 | −0.6856 | L2-2 |
| STO | Standard | Infinity | 0.1 | 1.472683 | 0 | |
| R6 | EvenAsphere | 3.436 | 1.339 | 2.04 | −2.17 | L3-1 |
| R7 | EvenAsphere | −2.806 | 0.262776 | 2.64 | 0 | L3-2 |
| R8 | EvenAsphere | 24.682 | 0.9345 | 2.84 | 0 | L4-1 |
| R9 | EvenAsphere | 3.12 | 0.9055615 | 3.4 | −3.69 | L4-2 |
| 10 | Standard | Infinity | 0 | 4.187865 | 0 | focusing |

TABLE 2-continued

Example Surface Data for Imaging Lens 100

| Surf | Type | Radius | Thickness | Diameter | Conic | Comment |
|------|------|--------|-----------|----------|-------|---------|
| R11 | EvenAsphere | −86.57 | 1.420233 | 4.4 | 0 | L5-1 |
| R12 | EvenAsphere | 56.21 | 0.624527 | 4.84 | 0 | L5-2 |
| 13 | Standard | Infinity | 0.3 | 6 | 0 | |
| 14 | Standard | Infinity | 0.0828 | 6 | 0 | |
| IMA | Standard | Infinity | | | | |

Figure 2:
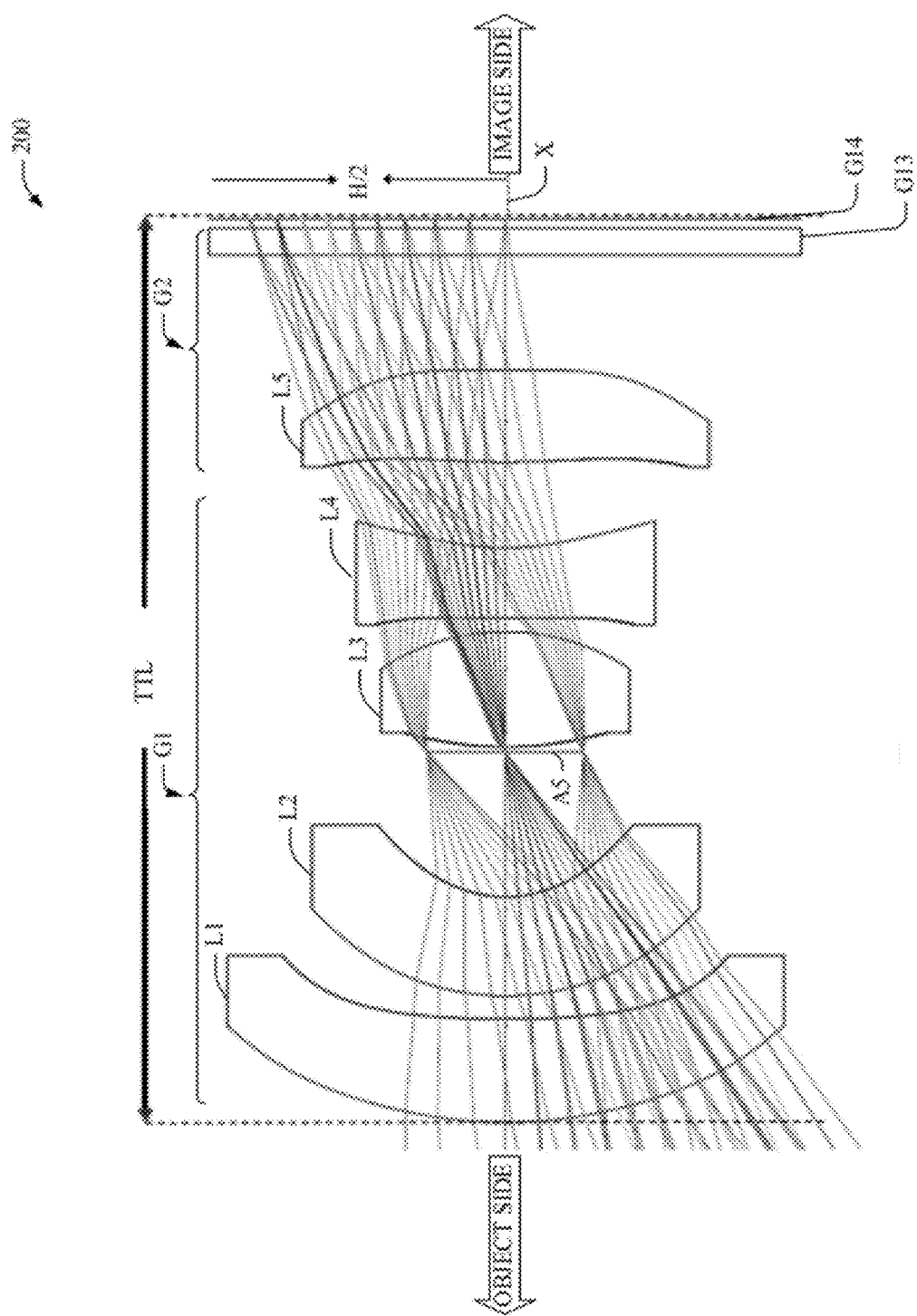
FIG. 2 illustrates a block diagram of an example optical imaging system representative of various aspects of the subject disclosure.

FIG. 2 shows at least one embodiment of imaging lens 200 in accordance with the disclosures herein including a ray diagram demonstrating light travelling through the system. Light entering at the object side (left) of lens L1 can interact sequentially with lens L1, lens L2, lens L3, lens L4, lens L5, and other elements of imaging lens 200, and exit the right side, or image side, of lens L5, toward sensor G13. It should be appreciated that not all light interacting with the left side of lens L1, lens L2, lens L3, lens L4 and lens L5, and other elements of imaging lens 200, will be transmitted to sensor G13; some light can be reflected off of respective elements, some light can be scattered away from optical axis X and absorbed (e.g., by an optical stop), and so forth. However, in general, imaging lens 200 will receive light from an object on one side of the elements (e.g., the object side, or the left side) and form a real image of the object on an opposite side of the elements (e.g., on the right side). The real image will be formed along optical axis X a certain distance from the optical elements, an image distance. Notably, the image distance depends primarily on a corresponding object distance (the distance between the object and the optical elements along optical axis X) and a refractive power, or optical power, of the combined optical elements.

In an embodiment of imaging lens 200, the image circle can be influenced at least in part by the total track length and image height. In an embodiment, the total track length can be 10.35 millimeters (mm). In one or more embodiments, the imaging lens 200 can satisfy the following condition:

$$\frac{TTL}{f} < G$$

where TTL can be the total track length and f can be the focal length of the entire imaging lens 200. In an embodiment, G can be 1.56. In one or more embodiments where the above condition is satisfied, accurate correction of field curvature can be accomplished, and the total track length of imaging lens 200 can be reduced. However, other embodiments are possible, although some embodiments where the ratio is decreased may experience varying degrees of aberration, and increases to the ratio enlarge the size of imaging lens 200 and may make optical systems including imaging lens 200 less flexible in application.

One or more embodiments of imaging lens 200 can fulfill the following further constraints as well:

$$\frac{f_1}{f} < J$$

$$\frac{f_1}{f_{G1}} < L$$

where $f_1$ can be the focal length of lens L1, $f$ can be the focal length of the entire imaging lens 200, and $f_{G1}$ can be the focal length of lens group G1. In an embodiment, J can be 1.27. In an embodiment, L can be 1.12. In an embodiment of imaging lens 200 that meets these constraints, L1 can have a relatively high optical power. Where L1 has a relatively high optical power, the total track length can be kept to an acceptably small value.

Still further, one or more embodiments of imaging lens 200 can fulfill the following constraints in addition to the above:

$$\frac{f_{G1}}{f} < M$$

$$\frac{f_{G2}}{f} < O$$

where $f_{G1}$ can be the focal length of lens group G1, $f_{G2}$ can be the focal length of lens group G2, and $f$ can be the focal length of the entire imaging lens 200. In an embodiment, M can be 0.98. In an embodiment, O can be 9.36. While other embodiments are possible in accordance with features of this application, the above conditions describe one means of allowing concurrent correction of field curvature and unintentional distortion, as well as maintaining favorable correction of aberrations and allowing correction of astigmatism and chromatic aberrations simultaneously.

In an embodiment, imaging lens 200 can satisfy other constraints including:

$$\frac{b_f}{f} < P$$

where $f$ can be the focal length of imaging lens 200 and $b_f$ can be the back focal length, defined as the distance from the image-side surface of lens L5 to an imaging surface, where an object at infinity is in focus. In an embodiment, P can be 0.155. Satisfaction of the above constraint permits a component (e.g. a filter) to be inserted between an imaging lens and an imaging surface without compromising the compact structure of an embodiment of imaging lens 200.

The tables provided below also provide further details concerning imaging lens 200. Table 3 lists the values of aspheric coefficients used to achieve desired zoom performance for some surfaces. Table 4 lists the refractive index of each surface of lenses for various wavelengths.

TABLE 3

Example Optical Surface Data for Imaging Lens 100

| Surface OBJ: | Standard |
| Surface 1: | Even Asphere L1-1 |

TABLE 3-continued

Example Optical Surface Data for Imaging Lens 100

| | |
|---|---|
| Coeff on r 2: | 0 |
| Coeff on r 4: | 0.001276772 |
| Coeff on r 6: | −0.000659597 |
| Coeff on r 8: | 3.30E−05 |
| Coeff on r 10: | 7.02E−07 |
| Coeff on r 12: | 0 |
| Coeff on r 14: | 0 |
| Coeff on r 16: | 0 |
| Aperture: | Floating Aperture |
| Maximum Radius: | 3.2 |
| Surface 2: | Even Asphere L1-2 |
| Coeff on r 2: | 0 |
| Coeff on r 4: | 0.005822264 |
| Coeff on r 6: | 0.000382656 |
| Coeff on r 8: | −0.000164187 |
| Coeff on r 10: | 1.32E−05 |
| Coeff on r 12: | 0 |
| Coeff on r 14: | 0 |
| Coeff on r 16: | 0 |
| Aperture: | Floating Aperture |
| Maximum Radius: | 2.75 |
| Surface 3: | Even Asphere L2-1 |
| Coeff on r 2: | 0 |
| Coeff on r 4: | −0.000165307 |
| Coeff on r 6: | 0.004660213 |
| Coeff on r 8: | 0.00011466 |
| Coeff on r 10: | −0.000159725 |
| Coeff on r 12: | 0 |
| Coeff on r 14: | 0 |
| Coeff on r 16: | 0 |
| Aperture: | Floating Aperture |
| Maximum Radius: | 2.14 |
| Surface 4: | Even Asphere L2-2 |
| Coeff on r 2: | 0 |
| Coeff on r 4: | −0.017781601 |
| Coeff on r 6: | −0.012895798 |
| Coeff on r 8: | 0.02359317 |
| Coeff on r 10: | −0.011777299 |
| Coeff on r 12: | 0.00152449 |
| Coeff on r 14: | 0 |
| Coeff on r 16: | 0 |
| Aperture: | Floating Aperture |
| Maximum Radius: | 1.54 |
| Surface STO: | Standard |
| Surface 6: | Even Asphere L3-1 |
| Coeff on r 2: | 0 |
| Coeff on r 4: | −0.00283323 |
| Coeff on r 6: | −0.002721375 |
| Coeff on r 8: | 0 |
| Coeff on r 10: | 0 |
| Coeff on r 12: | 0 |
| Coeff on r 14: | 0 |
| Coeff on r 16: | 0 |
| Aperture: | Floating Aperture |
| Maximum Radius: | 1.02 |
| Surface 7: | Even Asphere L3-2 |
| Coeff on r 2: | 0 |
| Coeff on r 4: | −0.022162917 |
| Coeff on r 6: | 0.010308255 |
| Coeff on r 8: | −0.002958422 |
| Coeff on r 10: | 0 |
| Coeff on r 12: | 0 |
| Coeff on r 14: | 0 |
| Coeff on r 16: | 0 |

TABLE 3-continued

Example Optical Surface Data for Imaging Lens 100

| | |
|---|---|
| Aperture: | Floating Aperture |
| Maximum Radius: | 1.32 |
| Surface 8: | Even Asphere L4-1 |
| Coeff on r 2: | 0 |
| Coeff on r 4: | −0.060587636 |
| Coeff on r 6: | 0.011469782 |
| Coeff on r 8: | 0 |
| Coeff on r 10: | 0 |
| Coeff on r 12: | 0 |
| Coeff on r 14: | 0 |
| Coeff on r 16: | 0 |
| Aperture: | Floating Aperture |
| Maximum Radius: | 1.42 |
| Surface 9: | Even Asphere L4-2 |
| Coeff on r 2: | 0 |
| Coeff on r 4: | −0.021190874 |
| Coeff on r 6: | 0.002966736 |
| Coeff on r 8: | 0.000242294 |
| Coeff on r 10: | 0 |
| Coeff on r 12: | 0 |
| Coeff on r 14: | 0 |
| Coeff on r 16: | 0 |
| Aperture: | Floating Aperture |
| Maximum Radius: | 1.7 |
| Surface 10: | Standard focusing |
| Surface 11: | Even Asphere L5-1 |
| Coeff on r 2: | 0 |
| Coeff on r 4: | 0.016863938 |
| Coeff on r 6: | −0.002969396 |
| Coeff on r 8: | 0.000602455 |
| Coeff on r 10: | −6.47E−05 |
| Coeff on r 12: | 0 |
| Coeff on r 14: | 0 |
| Coeff on r 16: | 0 |
| Aperture: | Floating Aperture |
| Maximum Radius: | 2.2 |
| Surface 12: | Even Asphere L5-2 |
| Coeff on r 2: | 0 |
| Coeff on r 4: | −0.04600715 |
| Coeff on r 6: | 0.002770701 |
| Coeff on r 8: | 0.001221962 |
| Coeff on r 10: | −0.000135527 |
| Coeff on r 12: | 0 |
| Coeff on r 14: | 0 |
| Coeff on r 16: | 0 |
| Aperture: | Floating Aperture |
| Maximum Radius: | 2.42 |
| Surface 13: | Standard |
| Aperture: | Floating Aperture |
| Maximum Radius: | 3 |
| Surface 14: | Standard |
| Aperture: | Floating Aperture |
| Maximum Radius: | 3 |
| Surface IMA: | Standard |

TABLE 4

| Example Index of Refraction Data for Imaging Lens 100 | | | | | | | |
|---|---|---|---|---|---|---|---|
| Surf | Temp | Pres | 0.420000 | 0.486000 | 0.546000 | 0.588000 | 0.656000 |
| 0 | 23.00 | 1.00 | 1.00000000 | 1.00000000 | 1.00000000 | 1.00000000 | 1.00000000 |
| 1 | 23.00 | 1.00 | 1.52-1.56 | 1.51-1.55 | 1.51-1.55 | 1.51-1.55 | 1.50-1.54 |
| 2 | 23.00 | 1.00 | 1.00000000 | 1.00000000 | 1.00000000 | 1.00000000 | 1.00000000 |
| 3 | 23.00 | 1.00 | 1.63-1.67 | 1.61-1.65 | 1.60-1.64 | 1.59-1.63 | 1.58-1.62 |
| 4 | 23.00 | 1.00 | 1.00000000 | 1.00000000 | 1.00000000 | 1.00000000 | 1.00000000 |
| 5 | 23.00 | 1.00 | 1.00000000 | 1.00000000 | 1.00000000 | 1.00000000 | 1.00000000 |
| 6 | 23.00 | 1.00 | 1.53-1.57 | 1.53-1.57 | 1.52-1.56 | 1.52-1.56 | 1.52-1.56 |
| 7 | 23.00 | 1.00 | 1.00000000 | 1.00000000 | 1.00000000 | 1.00000000 | 1.00000000 |
| 8 | 23.00 | 1.00 | 1.63-1.67 | 1.61-1.65 | 1.60-1.64 | 1.59-1.63 | 1.58-1.62 |
| 9 | 23.00 | 1.00 | 1.00000000 | 1.00000000 | 1.00000000 | 1.00000000 | 1.00000000 |
| 10 | 23.00 | 1.00 | 1.00000000 | 1.00000000 | 1.00000000 | 1.00000000 | 1.00000000 |
| 11 | 23.00 | 1.00 | 1.53-1.57 | 1.53-1.57 | 1.52-1.56 | 1.52-1.56 | 1.52-1.56 |
| 12 | 23.00 | 1.00 | 1.00000000 | 1.00000000 | 1.00000000 | 1.00000000 | 1.00000000 |
| 13 | 23.00 | 1.00 | 1.51-1.55 | 1.50-1.54 | 1.50-1.54 | 1.50-1.54 | 1.50-1.54 |
| 14 | 23.00 | 1.00 | 1.00000000 | 1.00000000 | 1.00000000 | 1.00000000 | 1.00000000 |
| 15 | 23.00 | 1.00 | 1.00000000 | 1.00000000 | 1.00000000 | 1.00000000 | 1.00000000 |

| Edge Thickness Data for Imaging Lens 100 | |
|---|---|
| Surf | Edge |
| OBJ | 1001.006523 |
| 1 | 0.620032 |
| 2 | 0.968433 |
| 3 | 0.753527 |
| 4 | 1.057892 |
| STO | 0.241552 |
| 6 | 0.827557 |
| 7 | 0.521241 |
| 8 | 1.353106 |
| 9 | 0.598382 |
| 10 | 0.189070 |
| 11 | 0.765646 |
| 12 | 1.090044 |
| 13 | 0.300000 |
| 14 | 0.100000 |
| IMA | 0.000000 |

System Temperature: 23.0000 Celsius
System Pressure: 1.0000 Atmospheres
Absolute air index: 1.00027 at wavelength 0.546000 μm
Index data is relative to air system temperature and pressure.
Wavelengths are measured in air at the system temperature and pressure.

In an embodiment, the Abbe numbers of the lenses of imaging lens 200 can be as follows. Lens L1 can have an Abbe number within a range of 53.00 to 57.00, lens L2 and lens L4 can have an Abbe number within a range of 23.00 to 27.00, and lens L3 and lens L5 can have an Abbe number within a range of 53.00 to 57.00. The respective Abbe numbers can also satisfy the following conditions:

$$v_{d1} - v_{d2} > Q$$

$$v_{d3} - v_{d4} > R$$

where $v_{d1}$ can be the Abbe number of lens L1, $v_{d2}$ can be the Abbe number of lens L2, $v_{d3}$ can be the Abbe number of lens L3, and $v_{d4}$ can be the Abbe number of lens L4. In an embodiment Q can be 30. In an embodiment, R can be 30. Satisfaction of these conditions enables greater control of lateral color aberration and allows sufficient correction of chromatic aberration.

Figure 3:
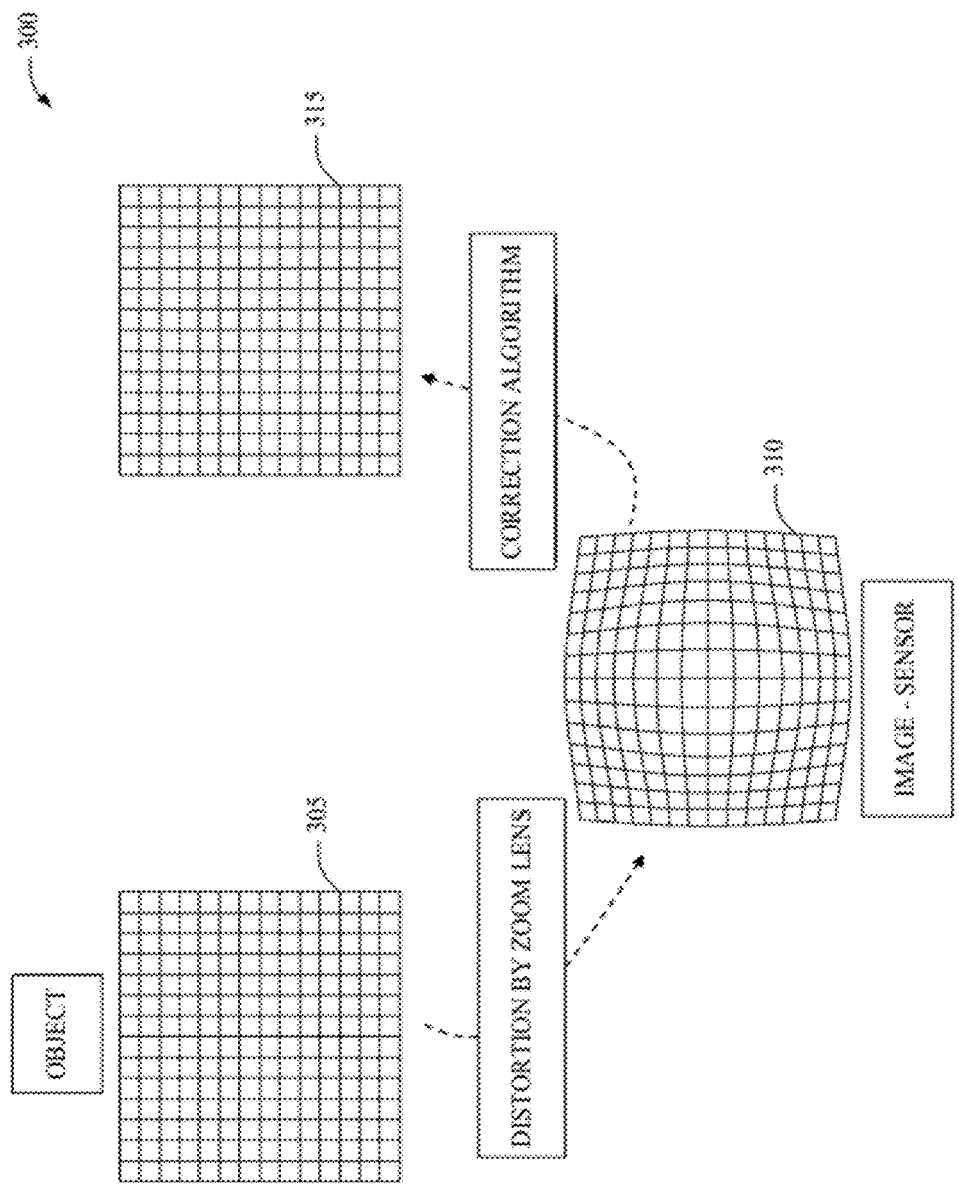
FIG. 3 depicts example images demonstrating how a zoom lens in accordance with the subject disclosure can distort and correct an image of an object.

FIG. 3 depicts series 300 demonstrating how the zoom lens transforms and corrects object information to produce an image. Object 305 represents an object with a grid structure. Object 305 can be transformed by a lens into distorted image 310 on a sensor. In an embodiment, distorted image 310 can have a barrel-like distortion. A matching algorithm can be employed to obtain restored grid 315 on an image screen. In an embodiment, the equations employed to define the (u,v) coordinate system supra can be utilized in conjunction with the matching algorithm. In an embodiment, a zoom lens can be designed to provide a rotational symmetric distortion, such that the distortion properties can be formulated as a one-dimensional function.

Figure 4:
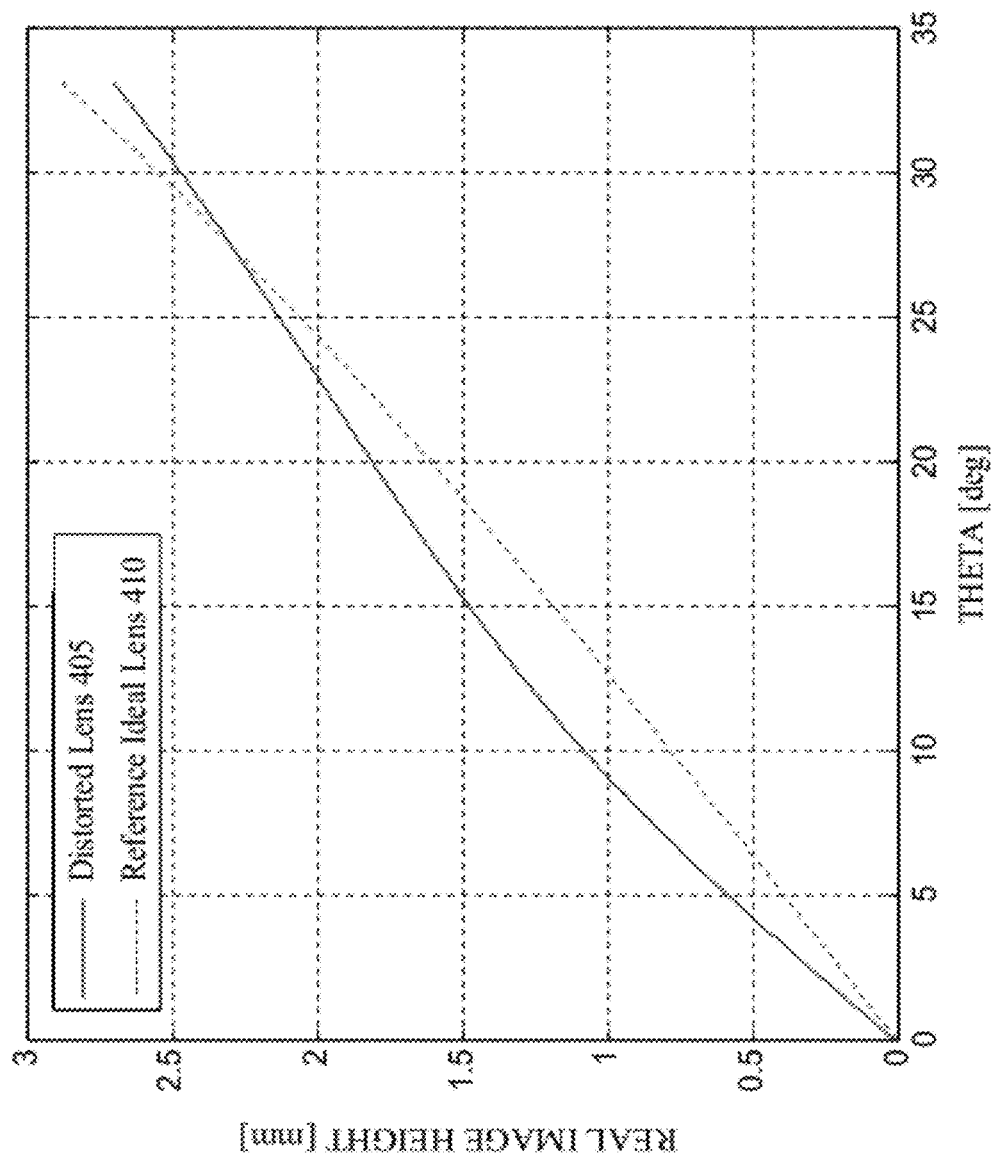
FIG. 4 illustrates a graph comparing distorted and undistorted radii as functions of a half view angle.

FIG. 4 illustrates a graph representing distorted radii 405 as a function of the half view angle compared with undistorted radii 410. The distorted radial function defines the optical zoom value given by the lens.

Figure 5:
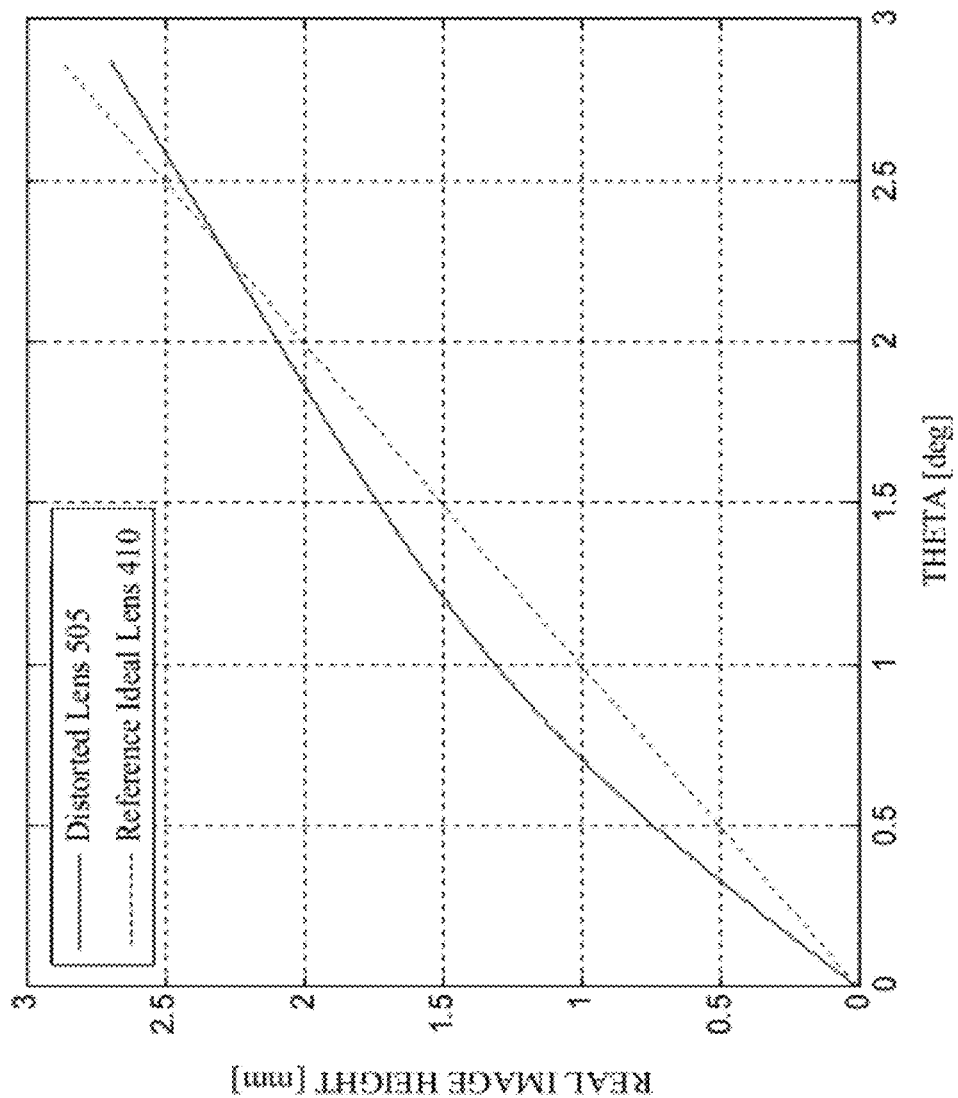
FIG. 5 depicts a graph showing a height of an image for a standard lens and a distorted zoom lens.

FIG. 5 depicts a graph representing a height of an image on a sensor for a traditional lens and a distorted zoom lens. Regular lens curve 510 portrays a linear relationship between the real height of the image and the height of the image on the sensor. In contrast, zoom lens curve 505 of the present invention demonstrates that a height of an image on a sensor changes with the distance from the center of the sensor in a non-linear manner. Thus, the image on the sensor can be higher at the center of the lens and shorter in the periphery. Accordingly, zoom lens curve 505 describes how this design enables an optical zoom effect without the use of moving parts.

Figure 6:
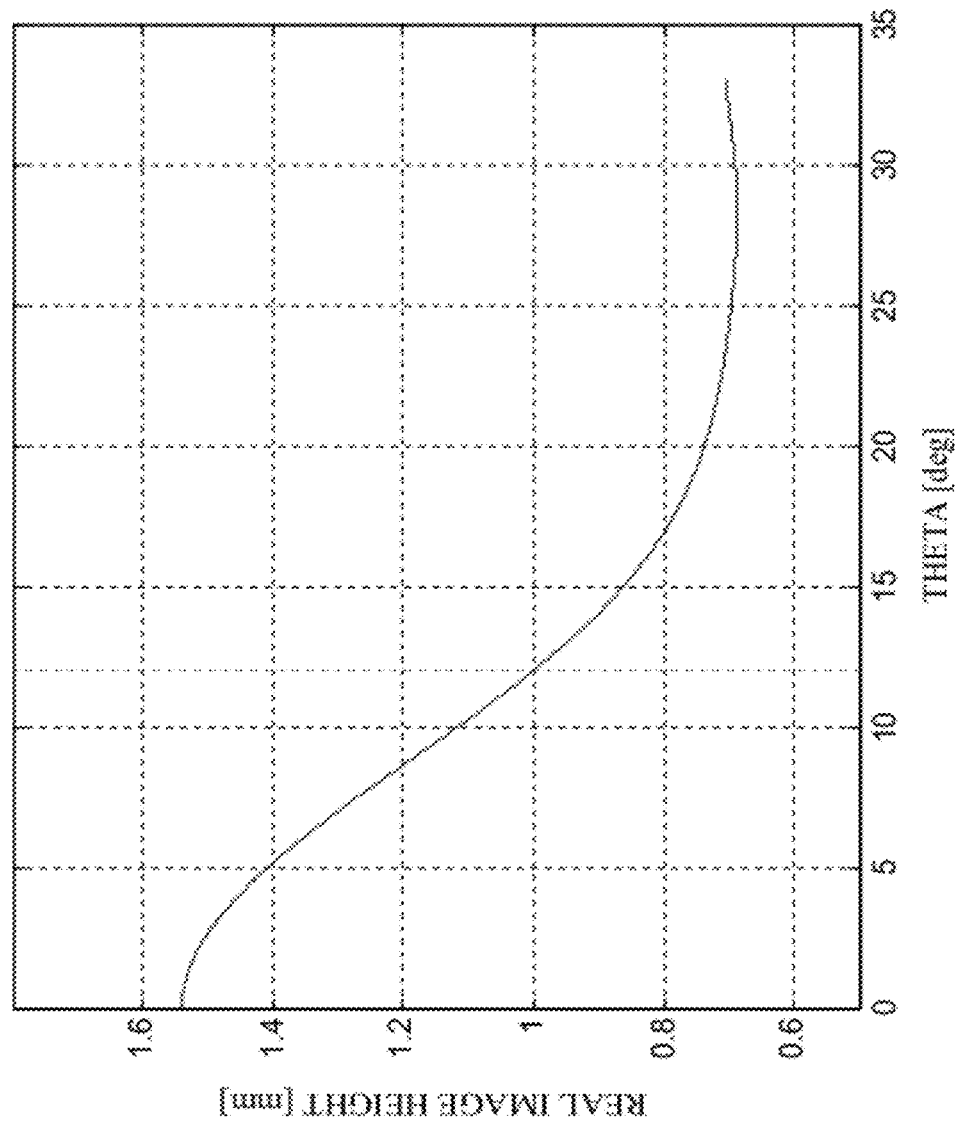
FIG. 6 illustrates zoom magnification as a function of the field of view in a lens.

FIG. 6 illustrates a graph representing zoom magnification as a function of the field of view in the lens in accordance with the subject disclosure. As can be seen, maximal magnification can be obtained at the center of the lens (where angle θ is zero). Continuing along the curve, when angle θ reaches a particular value, there is no magnification. In an embodiment, the particular value of θ at which the object is unmagnified can be 11 degrees. Finally, as field of view angle θ increases past the above value, the magnification decreases below one. In an embodiment, the zoom lens retains a specific field of view with an angle of view in that the reduction in the periphery offsets the magnification at the center. In one embodiment the angle of view can be 66 degrees, corresponding to a θ value of 33 degrees. In one or more embodiments of a lens comporting with the details of this disclosure, a maximal zoom magnification can include magnification up to 1.537, and a minimal zoom magnification can include magnification as little as 0.7.

Figure 7:
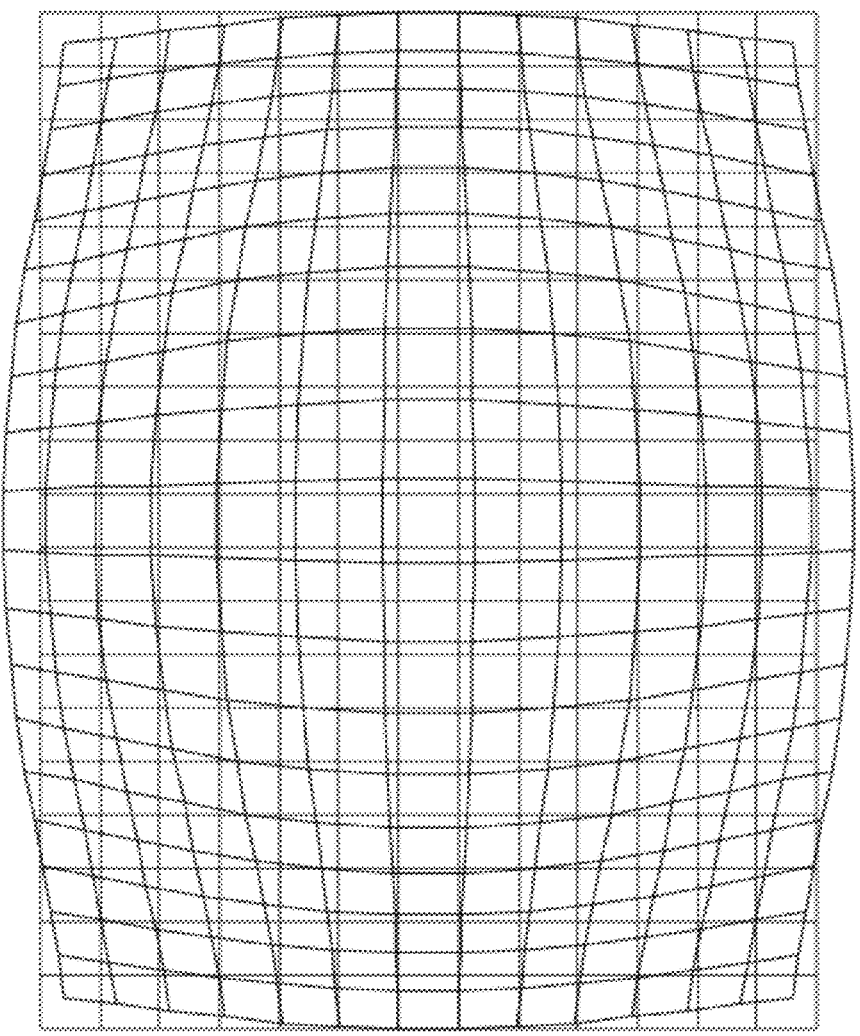
FIG. 7 depicts an image demonstrating how a grid of straight lines can be distorted by a zoom lens.

FIG. 7 depicts, for an embodiment of an imaging lens according with the disclosures herein, how a grid of straight lines can be distorted by the zoom lens. The magnitudes of the distorted lines are depends on the distance from the optical axis. Grid lines close to the center (e.g. θ approaching zero as described supra) the grid can be "expanded" in a symmetrical, barrel-like distortion pattern. In the periphery (e.g. θ greater than the value at which there is no magnification), the grid is "shrinking" with the barrel-like distortion.

Figure 8:
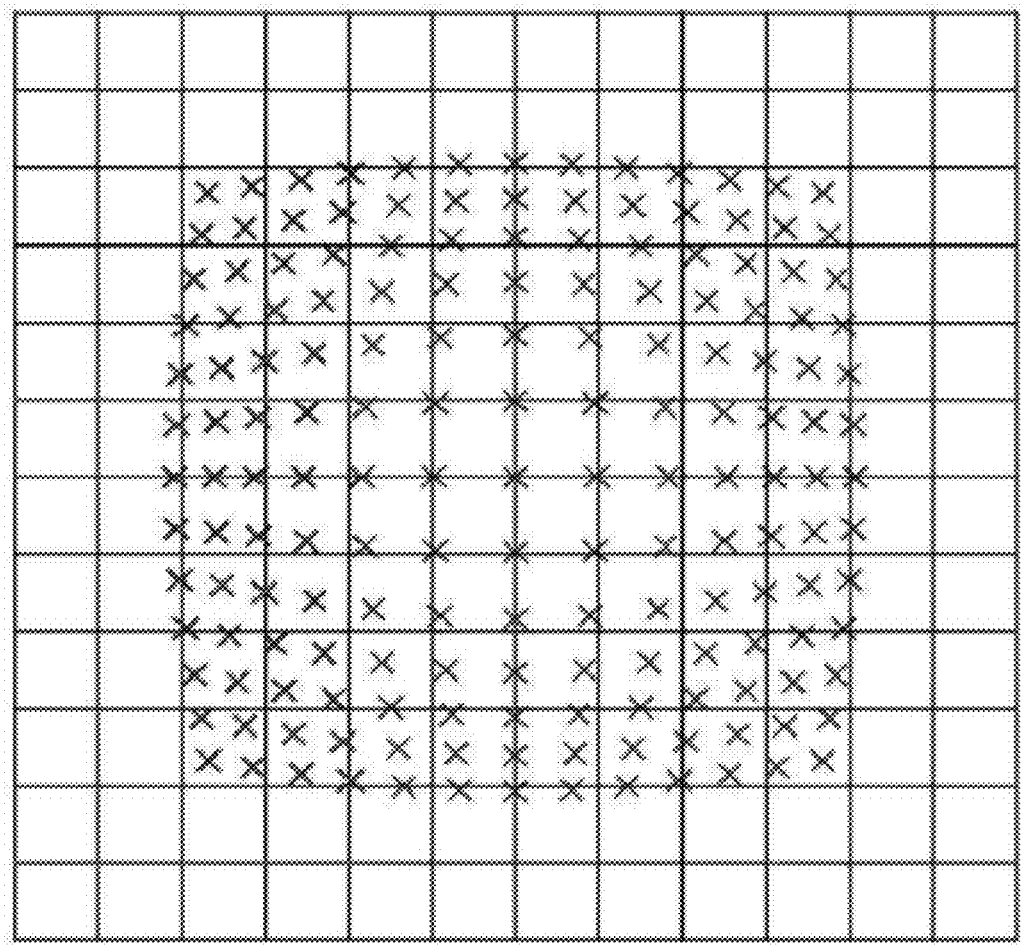
FIG. 8 illustrates a renormalized lens distortion that describes how a grid of straight lines can be distorted by the zoom lens.

FIG. 8 illustrates a grid showing a renormalized lens distortion. A grid of straight lines is shown as distorted by an embodiment of a zoom lens that comports with the disclosures herein. The distorted lines are represented by cross marks that display an increasing distortion with distance from the optical axis. In an embodiment, the field can be 49.3292 degrees, and an image can be a square with height and width of 6.23 mm. In addition, the maximum distortion can be −38.7517%, and a wavelength can be 0.5460 μm.

Figure 9:
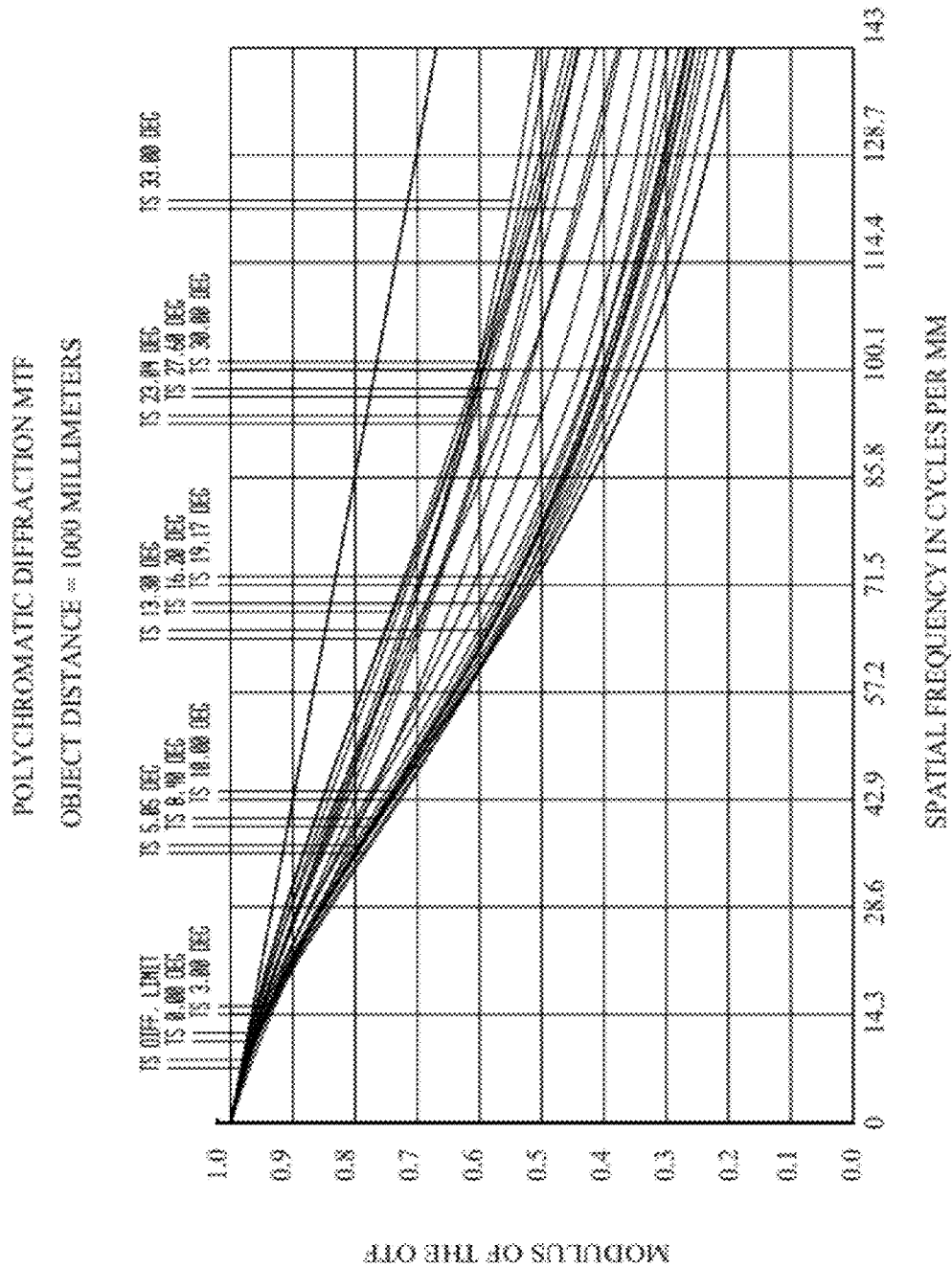
FIG. 9 illustrates a graph showing polychromatic diffraction modulation transfer function (MTF) for object distance of 1000 mm.

FIG. 9 illustrates a graph showing polychromatic diffraction modulation transfer function (MTF) curves. In an embodiment, the object distance can be 1000 mm, and the wavelength of light can vary from 0.4200 μm to 0.6560 μm.

Figure 10:
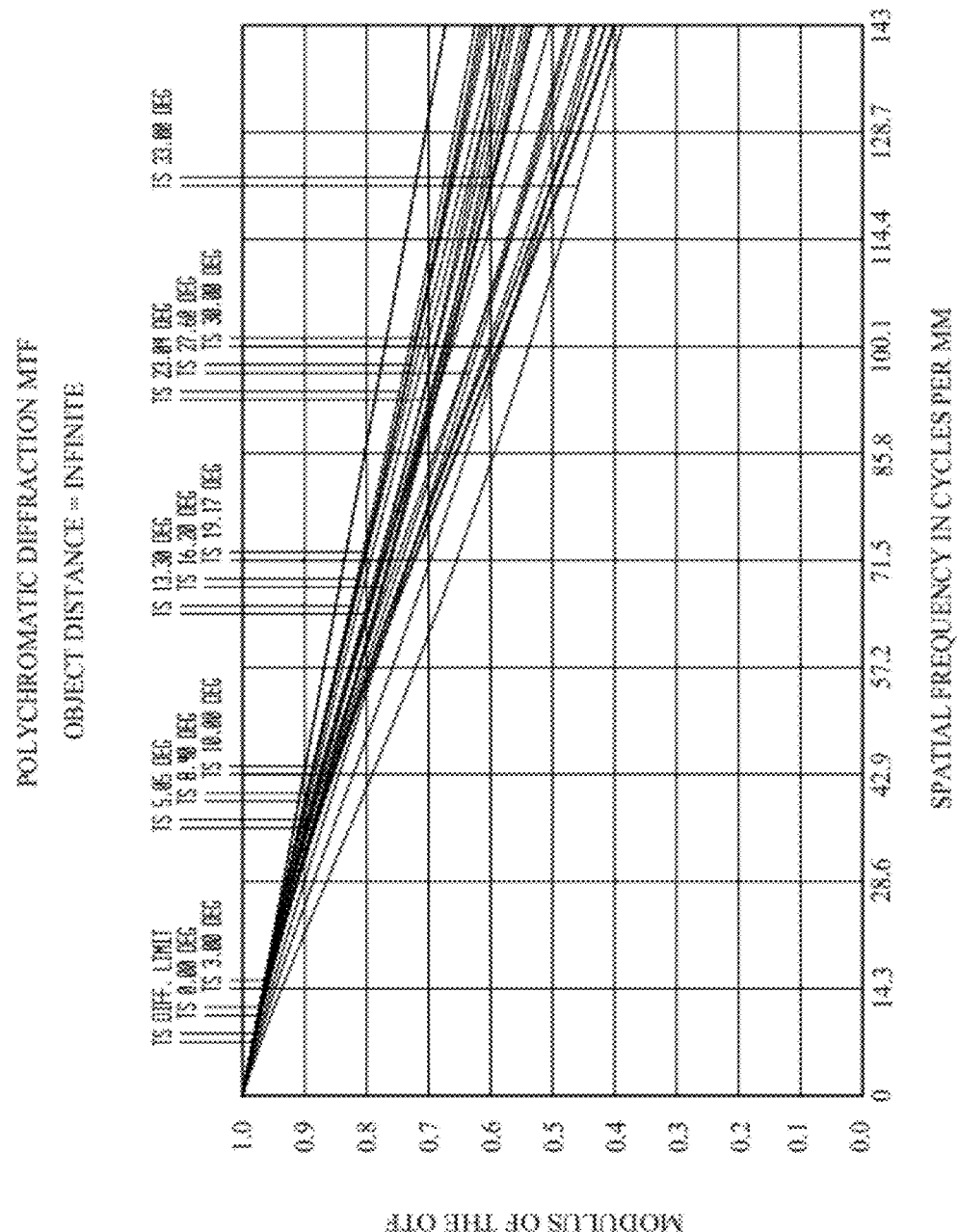
FIG. 10 depicts a graph showing calculated MTF curves for object distance of infinity.

FIG. 10 depicts a graph showing polychromatic diffraction MTF curves. In an embodiment, the object distance infinity, and the wavelength of light can vary from 0.4200 μm to 0.6560 μm.

Figure 11:
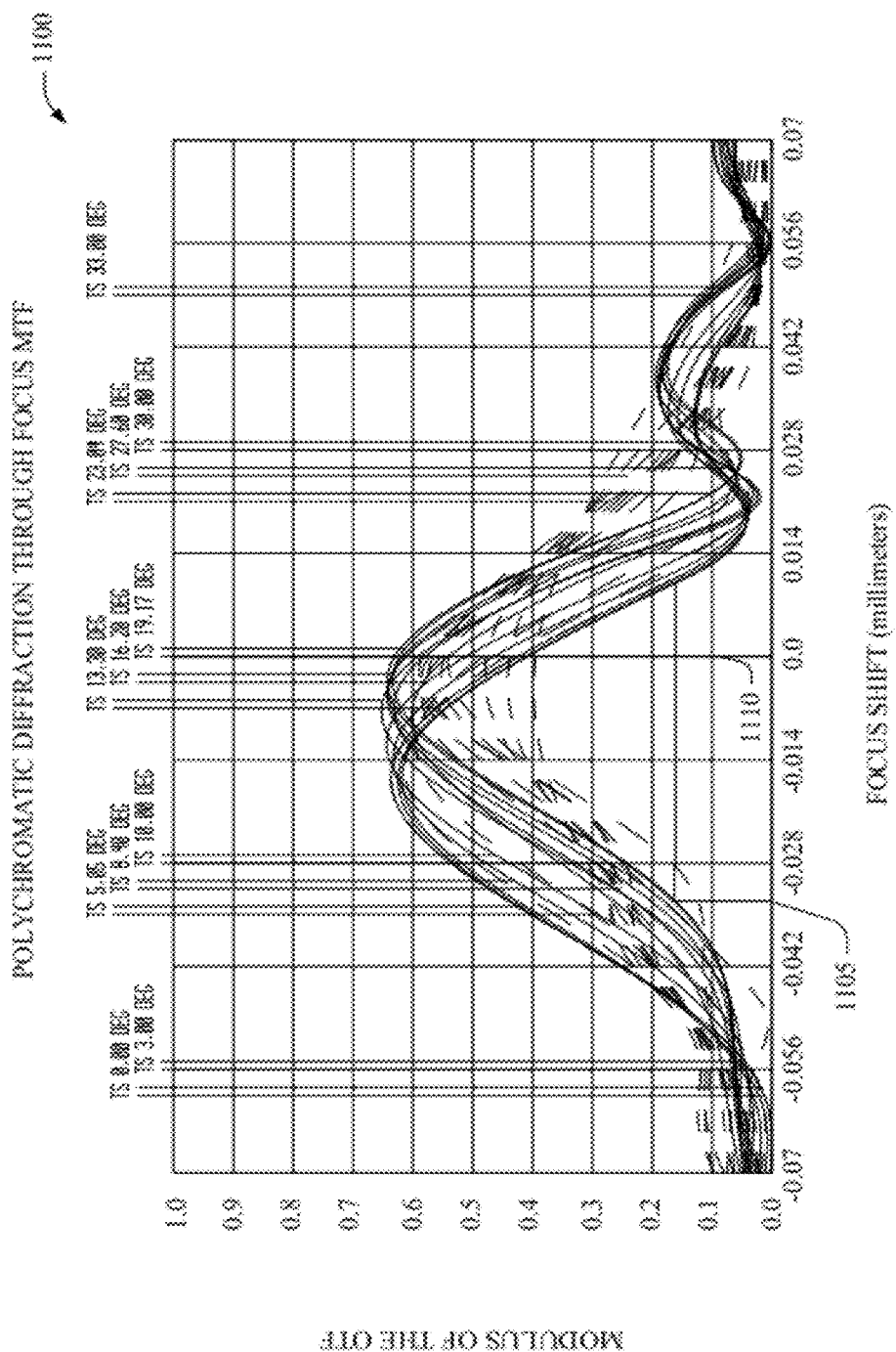
FIG. 11 illustrates a graph showing polychromatic diffraction through focus MTF curves of an example optical system disclosed herein.

FIG. 11 illustrates a graph 1100 showing polychromatic diffraction through focus MTF curves. In an embodiment, the spatial frequency can be 180 cycles per millimeter versus defocus distance (in mm). In another embodiment, the spatial frequency can be 143 cycles per millimeter. Wavelengths corresponding to the curves in FIG. 11 can be from 0.4200 μm to 0.6560 μm. In FIG. 11, bar 1105 and bar 1110 are visible below the curve, with vertical bar 1105 to the left (negative focus shift) of the origin, and vertical bar 1110 extending up approximately from the origin. These bars can correspond to a delimit range of defocus distance over which the modulation transfer function is greater than said range. In an embodiment, this value can be an MTF greater than 0.15. Bar 1105 can be at a focus shift of −0.033 mm, and can correspond to an object at a distance of 800 mm. Bar 1110 can be at a focus shift of 0.011 mm, and can correspond to an object a distance of infinity. In an embodiment, the defocus distances (e.g., −0.033 mm and 0.011 mm described above) can be the depth of field over which the range of defocus distances provide a contrast that is sufficient to resolve the image.

Figure 12:
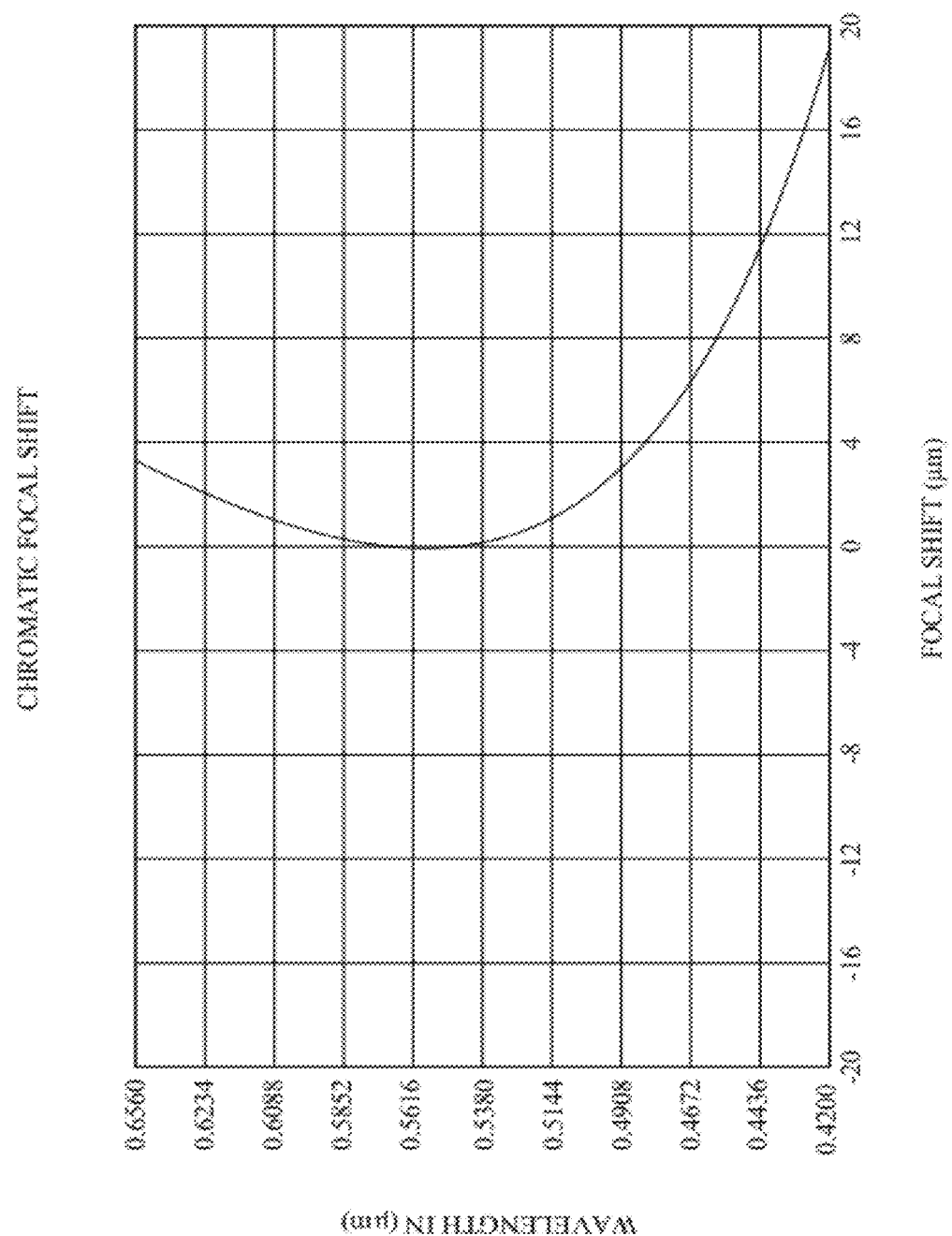
FIG. 12 depicts a graph showing a chromatic focal shift of an imaging zoom lens of an optical system in one disclosed embodiment.

FIG. 12 depicts a graph showing that a chromatic focal shift of an imaging zoom lens according to the disclosures herein can be smaller than that in a standard lens. In an embodiment, the chromatic focal shift can be 19 μm, as compared to 60 μm chromatic focal shift, which is typical for standard imaging lenses. In an embodiment, the maximum focal shift range can be 19.2486 μm, and the diffraction limited range can be 22.386 μm.

Figure 13:
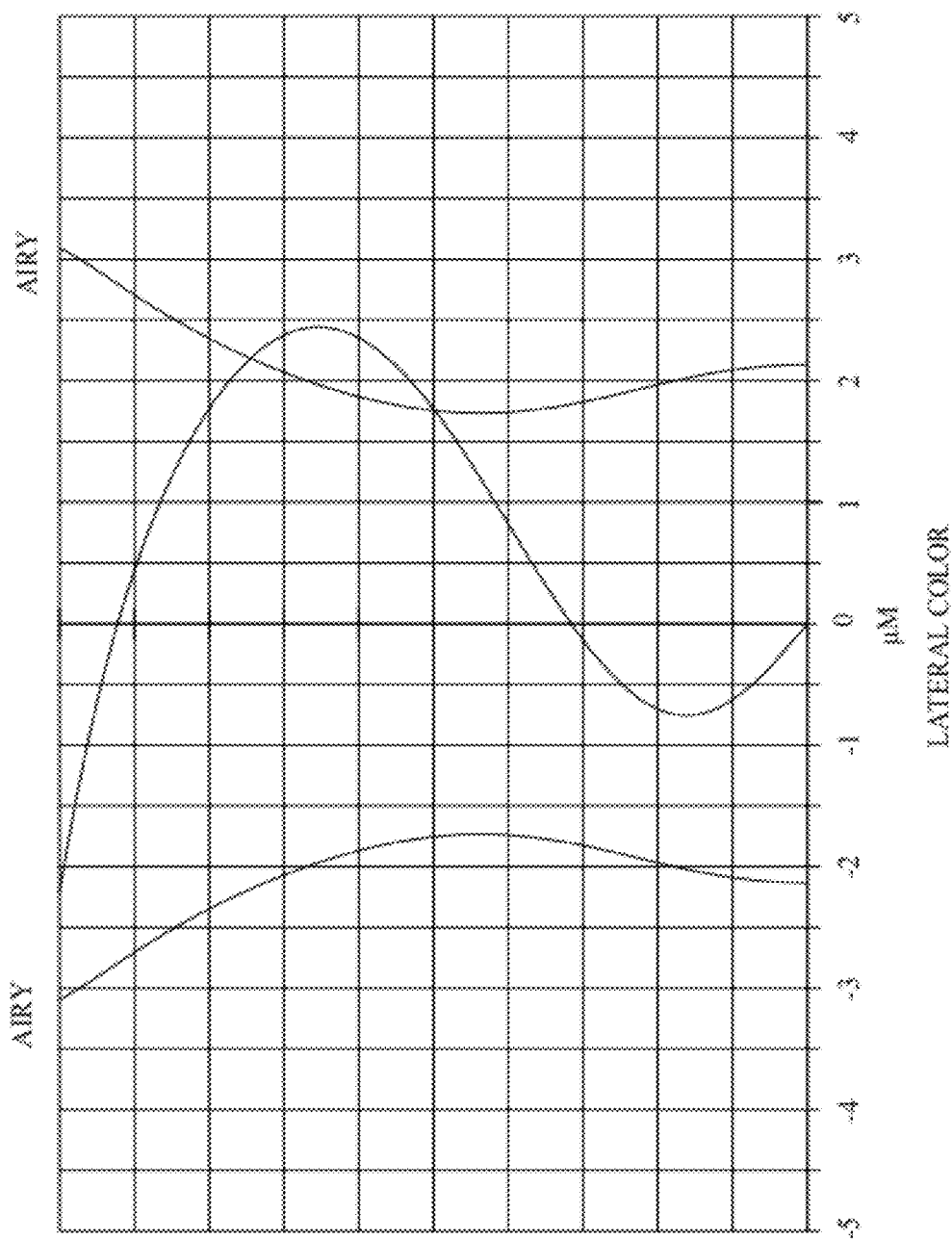
FIG. 13 illustrates a graph showing a lateral color error of an imaging zoom lens.

FIG. 13 illustrates a graph showing a lateral color error of an imaging zoom lens that comports with the aspects described in this application. As can be seen, the lateral color error of the lens can be approximately 2.5 μm, which is similar to the lateral color error of a standard imaging lens. In an embodiment, the maximum field can be 33 degrees.

Figure 14:
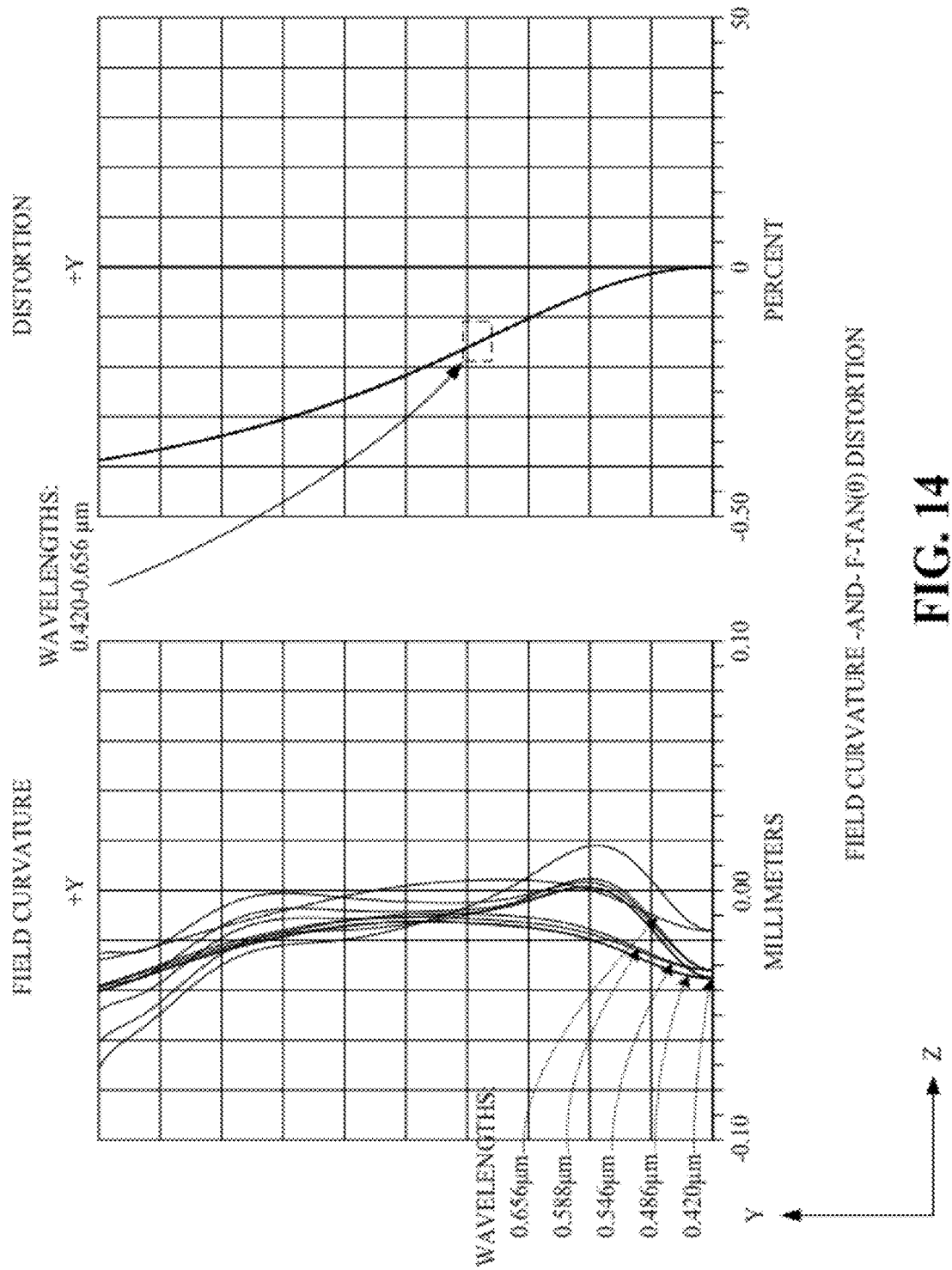
FIG. 14 depicts a graph showing field curvature and distortion for an example optical system.

FIG. 14 depicts a graph showing field curvature and distortion for an optical system in accordance with the features described in this application. Field curvature values from several wavelengths are displayed. In an embodiment, the wavelengths can be one or more of 0.420, 0.486, 0.546, 0.588 and 0.656 μm. The maximum field can be 33 degrees.

The distortion graph depicts normalized lens distortion in at least one embodiment of a zoom lens, as a function of half of the angle of the field of view. Intentional distortion that varies as a function of field angle can be designed into the lens such that a distortion that varies with field angle generates a real image having a zoom magnification that varies as a function of spatial position on an image plane. In an embodiment, the range of distortion when normalized can be from about zero (normalized) to about −40 percent. Examples of such distortion are shown supra in FIGS. 3-7. In an embodiment, the distortion can be defined by nonlinear radius mapping of points on the object to corresponding points at the image, and can have a rotational symmetry or substantially rotational symmetry. In another embodiment, maximum distortion is normalized to "zero" at the center of the image plane, which is represented by the origin of the distortion graph of FIG. 14, and distortion can decrease as Y increases, and in at least one embodiment, distortion can increase non-linearly as Y increases.

Figure 15:
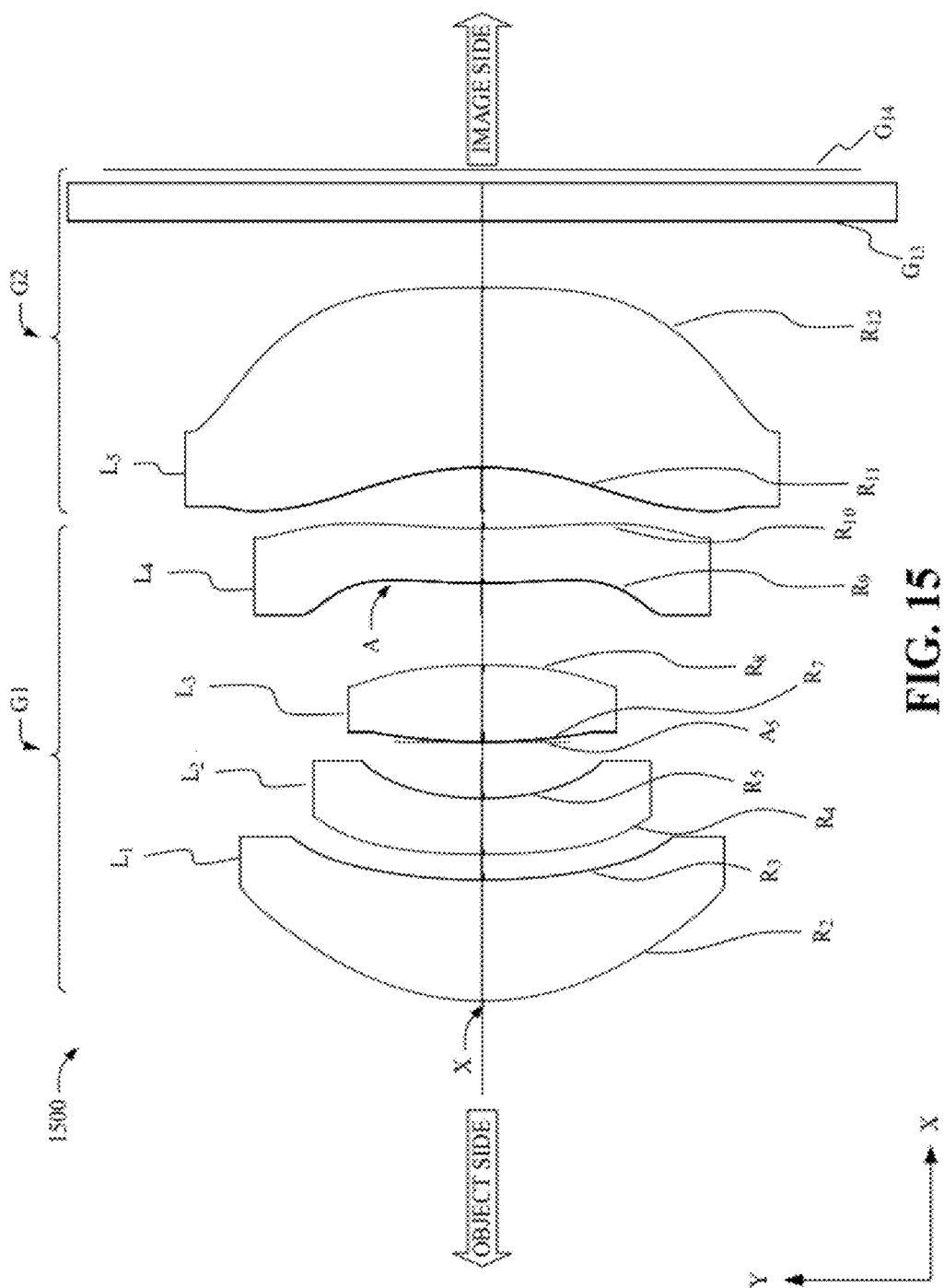
FIG. 15 depicts a diagram of an alternative zoom lens design utilizing non-linear distortion for zoom magnification according to further aspects.
Figure 16:
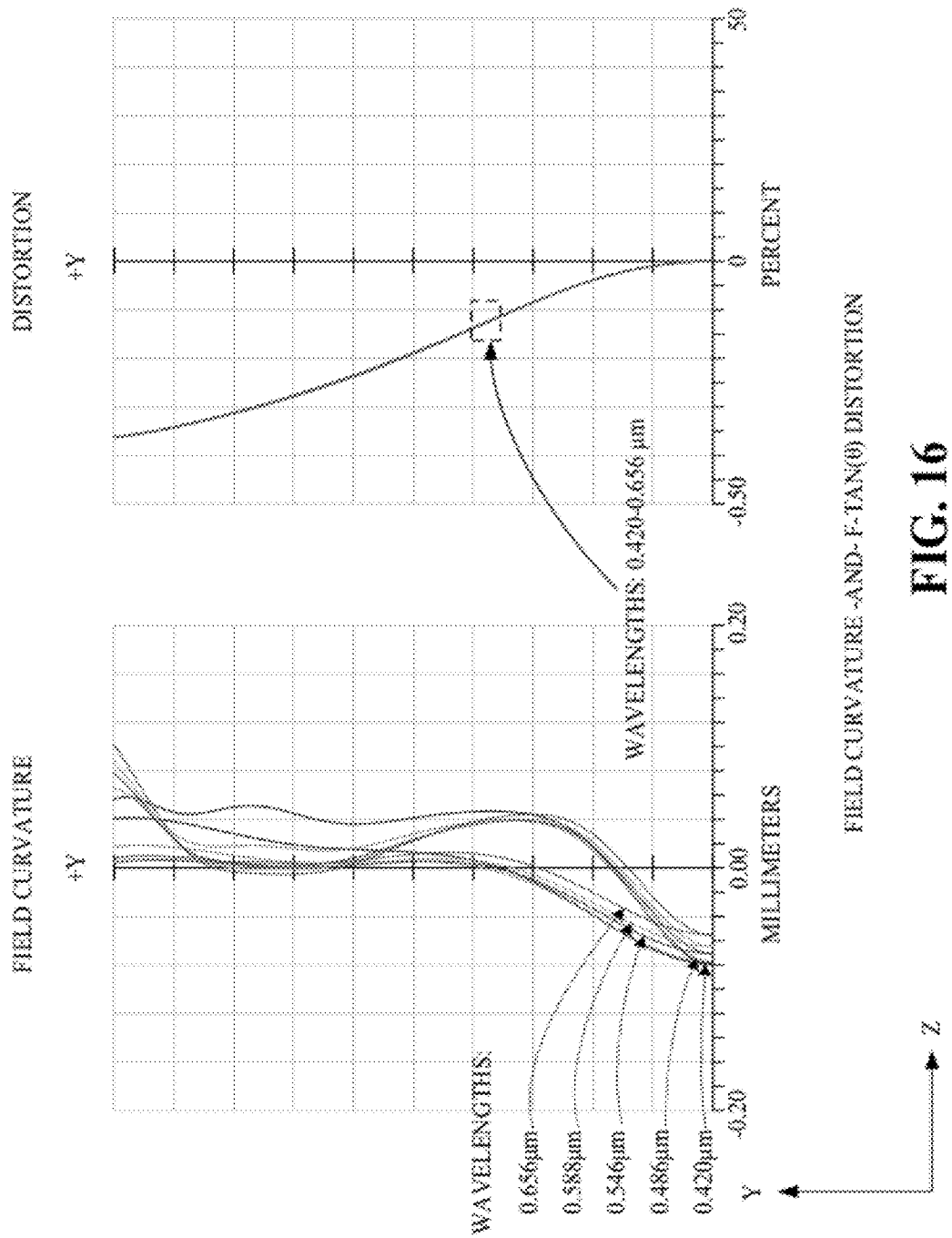
FIG. 16 illustrates a graph of field curvature and distortion for the alternative zoom lens.

FIG. 15 illustrates a diagram of an example imaging lens 1500 according to further aspects of the subject disclosure. Imaging lens 1500 can be designed with an optical distortion that varies as a function of field angle, and that expands an image near a center of a field of view, and compresses the image near a periphery of the field of view (e.g., see FIGS. 3-6, supra, for an illustration of another example distortion that varies with field angle to expand an image at a center of field of view and compress the image at a periphery of the field of view). According to one aspect of the subject disclosure, the distortion for imaging lens 1500 is depicted at FIG. 16, normalized at a center of the image (which corresponds to the center of the field of view) and extended to an edge of the image along a Y axis thereof.

In one aspect of the subject disclosure, imaging lens 1500 can be coupled with an image sensor $G_{14}$. In one aspect, sensor $G_{14}$ can have eight megapixels or approximately eight megapixels (e.g., within 2-3% of eight megapixels). In an additional aspect, all or substantially all of the pixels of sensor $G_{14}$ can have a dimension equal to 1.4 micrometers (μm) or substantially 1.4 μm. In a further aspect, a cover plate $G_{13}$ can be positioned between sensor $G_{14}$ and imaging lens 1500, as depicted at FIG. 15.

Further to the above, imaging lens 1500 can comprise five lens elements, labeled L1, L2, L3, L4 and L5 arranged in order along an optical axis 'X' from an object side—depicted by an arrow labeled "object side" on the left side of imaging lens 1500—to an image side—depicted by an arrow labeled "image side" on the right side of imaging lens 1500. Imaging lens 1500 can further comprise a stop A5, and in at least one aspect stop A5 can be located between lens element L2 and lens element L3. As mentioned above, imaging lens 1500 can comprise an optical distortion that varies as a function of field angle (e.g., see FIG. 16, infra). The distortion can be designed to be within a range of about −40 percent, and can be illustrated by a nonlinear radius mapping from an object to an image produced by imaging lens 1500. Further, the nonlinear radius mapping can be rotationally symmetric, or substantially rotationally symmetric, and can be designed to achieve a magnification that varies as a function of field angle (as an illustrative example, see FIG. 6, supra, although it should be understood that the magnification as a function of field angle for imaging lens 1500 can have a different curve than that depicted by FIG. 6).

In one aspect, imaging lens 1500 can have an F number of F/3.2, or substantially F/3.2, and can be a zoom lens comprising a first lens group, G1, having a combined positive refractive power, and a second lens group, G2, having a combined negative refractive power. In a particular aspect, group G1 can comprise lens elements L1, L2, L3 and L4, and furthermore group G2 can comprise lens element L5. In this particular aspect, lens element L1 can have a positive refractive power and a meniscus shape, having surfaces R2 and R3 that are respectively convex and concave. Lens element L2 can have a negative refractive power and a meniscus shape, comprising two surfaces, R4 and R5, which are convex and concave, respectively. Lens element L3 can have a positive refractive power, comprising two surfaces R7 and R8 that can both be convex. Additionally, lens element L4 can have a positive refractive power, comprising a convex surface R9 and a concave surface R10. In an alternate aspect, lens element L4 can have a small negative refractive power. In yet another aspect, lens element L4 can have a varying refractive power that is positive at a vertex of lens element L4, becomes negative away from the vertex, and increasingly negative at larger radial distances. Lens element L5 can have a negative refractive power and a meniscus shape, having two surfaces R11 and R12 that are concave and convex, respectively. In at least one aspect, lens element L5 can have a varying power that is negative near a vertex of lens element L5, becomes positive away from the vertex and increasingly positive at larger radial distances.

According to one or more additional aspects of the subject disclosure, lens elements L1, L2, L3, L4 and L5 have at least one aspheric surface, defined by the even asphere equation given at paragraph 0027, supra. In still other aspects, both surfaces of lens elements L1, L2, L3, L4 and L5 are aspheric, facilitating a bright image and correction of chromatic aberration. Furthermore, lens elements L1, L2, L3, L4 and L5 can be made of plastic. In one instance, lens elements L1, L3 and L5 can be made of a first plastic, whereas lenses L2 and L4 can be made of a second plastic. These materials comprise properties suitable for the lens design of lens elements L1, L2, L3, L4 and L5 given in Tables 5-8, infra, however other materials having similar refractive index and Abbe number can be utilized instead. Table 5 lists general lens data for imaging lens 1500. Table 6 lists surface number of respective lens elements from the object side, radius of curvature R (in mm) of respective surfaces near optical axis X (where R is related to curvature C of an aspheric surface and conic constant, K), on-axis thickness of respective surfaces, and diameter of respective lens elements.

TABLE 5

Example General Lens Data for Imaging Lens 1500

| | |
|---|---|
| Surfaces: | 15 |
| Stop: | 6 |
| System_Aperture: | Float_By_Stop_Size = 0.63 |
| Ray_Aiming: | Paraxial_Reference, Cache On |
| X_Pupil_shift: | 0 |
| Y_Pupil_shift: | 0 |
| Z_Pupil_shift: | −7.250887 |

TABLE 5-continued

| | | |
|---|---|---|
| X_Pupil_compress: | 0 | |
| Y_Pupil_compress: | 0 | |
| Apodization: | Uniform factor = 0.00E+00 | |
| Temperature(C): | 2.30E+01 | |
| Pressure(ATM): | 1.00E+00 | |
| Adjust_Index | On | |
| Data_To_Environment: | | |
| Effective_Focal_Length: | 5.77844 | (in air at system temperature andpressure) |
| Effective_Focal_Length: | 5.77844 | (in image space) |
| Back_Focal_Length: | 0.93 | |
| Total_Track: | 6.56 | |
| Image_Space F/#: | 3.115542 | |
| Paraxial_Working_F/#: | 3.115577 | |
| Working_F/+190: | 3.258912 | |
| Image_Space_NA: | 0.1584564 | |
| Object_Space_NA: | 9.27E−07 | |
| Stop_Radius: | 0.63 | |
| Paraxial_ Image_ | 4.198328 | |
| Paraxial_ agnification: | −5.78E−06 | |
| Entrance_Pupil_Diameter: | 1.854714 | |
| Entrance_Pupil_Position: | 2.866712 | |
| Exit_Pupil_Diameter: | 0.973084 | |
| Exit_Pupil_Position: | −3.115266 | |
| Field_Type: | Angle_in_degrees | |
| Maximum_Radial_Field: | 36 | |
| Primary_ Wavelength: | 0.546 μm | |
| Lens_Units: | Millimeters | |
| Angular_agnification: | 1.906017 | |

| Field Type: | Angle in degrees | | |
|---|---|---|---|
| # | X-Value | Y-Value | Weight |
| 1 | 0.000000 | 0.000000 | 1.000000 |
| 2 | 0.000000 | 4.000000 | 1.000000 |
| 3 | 0.000000 | 8.000000 | 1.000000 |
| 4 | 0.000000 | 12.000000 | 1.000000 |
| 5 | 0.000000 | 16.000000 | 1.000000 |
| 6 | 0.000000 | 20.000000 | 1.000000 |
| Field Angles | | | |
| 7 | 0.000000 | 24.000000 | 1.000000 |
| 8 | 0.000000 | 28.000000 | 1.000000 |
| 9 | 0.000000 | 30.000000 | 1.000000 |
| 10 | 0.000000 | 32.000000 | 1.000000 |
| 11 | 0.000000 | 34.000000 | 1.000000 |
| 12 | 0.000000 | 36.000000 | 1.000000 |

Wavelength Data

| Units: | μum | |
|---|---|---|
| # | Value | Weight |
| 1 | 0.420000 | 26.000000 |
| 2 | 0.486000 | 163.000000 |
| 3 | 0.546000 | 324.000000 |
| 4 | 0.588000 | 330.000000 |
| 5 | 0.656000 | 157.000000 |

TABLE 6

Example Surface Data for Imaging Lens 1500

| Surface | Type | Radius | Thickness | Diameter | Conic | Comment |
|---|---|---|---|---|---|---|
| OBJ | Standard | Infinity | 1000000 | 0 | | |
| 1 | Standard | Infinity | 0.362544 | 0 | | |
| R2 | EvenAsph | 1.821341 | 0.954942 | 3.5 | −0.84176 | L1 |
| R3 | EvenAsph | 4.580304 | 0.202337 | 0 | | |
| R4 | EvenAsph | 5.985963 | 0.440626 | 2.44 | 0 | L2 |
| R5 | EvenAsph | 1.952956 | 0.444345 | 3.576134 | | |
| STO | Standard | Infinity | 0 | 0 | | |
| R7 | EvenAsph | 4.082334 | 0.605358 | 1.58 | −25.8963 | L4 |
| R8 | EvenAsph | −3.983392 | 0.646608 | 0 | | |
| R9 | EvenAsph | 4.435335 | 0.431969 | 2.6 | 0 | L5 |
| R10 | EvenAsph | 5.374568 | 0.480951 | 0 | | |
| R11 | EvenAsph | −1.997789 | 1.418594 | 3.8 | 0 | L6 |
| R12 | EvenAsph | −15.9411 | 0.524569 | 0 | | |
| 13 | Standard | Infinity | 0.3 | 6 | 0 | CG (D263T) |
| 14 | Standard | Infinity | 0.105295 | 0 | | |
| IMA | Standard | Infinity | 5.486804 | | | |

As specified in Table 5, imaging lens 1500 can have an F number of F/3.2, and a total track length (TTL) of 6.56 mm. For cover glass $G_{13}$ listed in Table 5 and Table 6, a TTL/image size ratio is 1.155, and taking into account image distortion produced by imaging lens 1500, TTL/image size ratio is 1.217. In at least one additional aspect, imaging lens 1500 can have the following condition:

$$\frac{TTL}{f} < 1.13,$$

where $f$ is a combined focal length of lens elements L1, L2, L3, L4 and L5 of imaging lens 1500. This condition can provide field curvature correction (e.g., see FIG. 16, infra) while providing the TTL of 6.56 mm. The above ratios of TTL can be reduced below 6.56 mm at a cost to field curvature correction or chromatic aberration, or increased to further improve field curvature or chromatic aberration. According to one or more other aspects, imaging lens 1500 can obey the conditions:

$$\frac{f_1}{f} < 0.876; \text{ and } \frac{f_1}{f_{G1}} < 1.238;$$

where $f_1$ is a focal length of lens element L1, and $f_{G1}$ is a combined focal length of the first lens group $G_1$. Alternatively, or in addition, in this aspect(s) imaging lens 1500 can obey the conditions:

$$\frac{f_{G1}}{f} < 0.707; \text{ and } \frac{f_{G2}}{f} < 0.77;$$

where $f_{G2}$ is a focal length of the second lens group $G_2$. The foregoing conditions can provide simultaneous correction for field curvature and distortion that is not part of an intended or designed distortion. Additionally, the foregoing conditions can enable favorable correction of various optical aberrations as well as providing correction for astigmatism and chromatic aberration. Moreover, the condition $$\frac{f_1}{f} < 0.876$$

can correspond with a relatively high optical power in lens element L1, which can be effective in maintaining a relatively small TTL of imaging lens 1500 (e.g., TTL substantially equal to 6.56 mm). In yet another aspect, imaging lens 1500 can satisfy the following condition:

$$\frac{b_f}{f} < 0.162;$$

where $b_f$ is a back focal length of imaging lens 1500 (e.g., see Table 1, Thickness 12, 13 and 14), which is defined as a distance from surface R11 to sensor $G_{14}$ where an object at infinity (or, e.g., an object in a far field approximation relative to imaging lens 1500) is in focus at sensor $G_{14}$. This condition enables inserting a component such as a filter between imaging lens 1500 and sensor $G_{14}$ without increasing or without significantly increasing the TTL of imaging lens 1500.

In an additional aspect of the subject disclosure, imaging lens 1500 can be a zoom lens. When focusing imaging lens 1500 in this aspect, lens group G1 and lens group G2 can have a fixed distance there between, where both lens groups are moved relative to sensor $G_{14}$, the latter being fixed in position on optical axis X. As an alternative, imaging lens 1500 can be focused when only the second lens group G2 moves together with sensor $G_{14}$ relative to the first lens group G1, the latter being fixed in position on optical axis X. As yet another alternative, imaging lens 1500 can be focused when only the second lens group G2 moves relative to the first lens group and sensor $G_{14}$, which are both fixed in position on optical axis X. Table 7, below, lists example aspheric coefficients $A_i$ for i=2, 4, 6, 8, 10, 12, 14, 16 (the index "i" is denoted by "r" in Table 7, where $A_i$ is the "coefficient on r") employed for each of surfaces R2, R3, R4, R5, R7, R8, R9, R10, R11 and R12 of Table 6, supra, in a similar arrangement as provided by the optical design software ZEMAX. Table 8, below, lists suitable ranges for refractive index n, for each of lens elements L1, L2, L3, L4, L5 for specified wavelengths. In other aspects, lens elements L1, L2, L3, L4 and L5 have Abbe numbers $v_{d1}$, $v_{d2}$, $v_{d3}$, $v_{d4}$ and $v_{d5}$, respectively. In a particular aspect, the following conditions are satisfied:

$$v_{d1} - v_{d2} > 32; \text{ and } v_{d3} - v_{d4} > 32$$

These conditions can provide control for lateral color aberration and chromatic aberration of imaging lens 1500. In one specific aspect of the subject disclosure, Abbe numbers $v_d$ of the lens elements can be as follows: for lens elements L1, L3 and L5, $v_{d1}=v_{d3}=v_{d5}$ which can be in a range from 53.00 to 57.00, and for lens elements L2 and L4, $v_{d2}=v_{d4}$ which can be in range from 21.00 to 25.00.

TABLE 7

Example Optical Surface Data for Imaging Lens 1500

| | |
|---|---|
| Surface OBJ: | Standard |
| Surface_1: | Standard |
| Surface_R2: | Even Asphere L1-1 |
| Coeff on r 2: | 0 |
| Coeff on r 4: | 0.006337 |
| Coeff on r 6: | 0.003316 |
| Coeff on r 8: | −0.00658 |
| Coeff on r 10: | 0.001663 |
| Coeff on r 12: | 0 |
| Coeff on r 14: | 0 |
| Coeff on r 16: | 0 |
| Aperture: | Floating Aperture |
| Maximum Radius: | 1.75 |
| Surface_R3: | Even Asphere L1-2 |
| Coeff on r 2: | 0 |
| Coeff on r 4: | 0.061181 |
| Coeff on r 6: | −0.09048 |
| Coeff on r 8: | 0.063355 |
| Coeff on r 10: | −0.01209 |
| Coeff on r 12: | 0 |
| Coeff on r 14: | 0 |
| Coeff on r 16: | 0 |
| Aperture: | Floating Aperture |
| Maximum_Radius: | 1.38 |
| Surface_R4: | Even Asphere L2-1 |
| Coeff on r 2: | 0 |
| Coeff on r 4: | 0.115132 |
| Coeff on r 6: | −0.13595 |
| Coeff on r 8: | 0.142321 |
| Coeff on r 10: | −0.04558 |
| Coeff on r 12: | 0 |
| Coeff on r 14: | 0 |
| Coeff on r 16: | 0 |
| Aperture: | Floating Aperture |
| Maximum_Radius: | 1.22 |
| Surface_R5: | Even Asphere L2-2 |
| Coeff on r 2: | 0 |
| Coeff on r 4: | 0.076435 |
| Coeff on r 6: | −0.2658 |
| Coeff on r 8: | 0.503464 |
| Coeff on r 10: | −0.38585 |
| Coeff on r 12: | 0 |
| Coeff on r 14: | 0 |
| Coeff on r 16: | 0 |
| Aperture: | Floating Aperture |
| Maximum_Radius: | 0.87 |
| Surface_STO: | STANDARD |
| Surface_R7: | Even Asphere L3-1 |
| Coeff on r 2: | 0 |
| Coeff on r 4: | 0.034436 |
| Coeff on r 6: | −0.06612 |
| Coeff on r 8: | 0.126905 |
| Coeff on r 10: | −0.03582 |
| Coeff on r 12: | 0 |
| Coeff on r 14: | 0 |
| Coeff on r 16: | 0 |
| Aperture: | Floating Aperture |
| Maximum_Radius: | 0.79 |
| Surface_R8: | Even Asphere L3-2 |
| Coeff on r 2: | 0 |
| Coeff on r 4: | −0.10877 |
| Coeff on r 6: | 0.075253 |
| Coeff on r 8: | −0.13668 |
| Coeff on r 10: | 0.106407 |
| Coeff on r 12: | 0.011192 |
| Coeff on r 14: | 0 |
| Coeff on r 16: | 0 |
| Aperture: | Floating Aperture |

TABLE 7-continued

Example Optical Surface Data for Imaging Lens 1500

| | |
|---|---|
| Maximum_Radius: | 0.97 |
| Surface_R9: | Even Asphere L4-1 |
| Coeff on r 2: | 0 |
| Coeff on r 4: | −0.13941 |
| Coeff on r 6: | 0.027433 |
| Coeff on r 8: | −0.05241 |
| Coeff on r 10: | −0.0241 |
| Coeff on r 12: | 0.024936 |
| Coeff on r 14: | 0 |
| Coeff on r 16: | 0 |
| Aperture: | Floating Aperture |
| Maximum_Radius: | 1.3 |
| Surface_R10: | Even Asphere L4-2 |
| Coeff on r 2: | 0 |
| Coeff on r 4: | −0.06217 |
| Coeff on r 6: | 0.026097 |
| Coeff on r 8: | −0.03402 |
| Coeff on r 10: | 0.010225 |
| Coeff on r 12: | 0.00621 |
| Coeff on r 14: | −0.00417 |
| Coeff on r 16: | 0.000674 |
| Aperture: | Floating Aperture |
| Maximum_Radius: | 1.65 |
| Surface_R11: | Even Asphere L5-1 |
| Coeff on r 2: | 0 |
| Coeff on r 4: | 0.030745 |
| Coeff on r 6: | 0.028301 |
| Coeff on r 8: | −0.0063 |
| Coeff on r 10: | 0.000368 |
| Coeff on r 12: | 7.63E−06 |
| Coeff on r 14: | −2.48E−06 |
| Coeff on r 16: | 6.55E−06 |
| Aperture: | Floating Aperture |
| Maximum_Radius: | 1.9 |
| Surface_R12: | Even Asphere L5-2 |
| Coeff on r 2: | 0 |
| Coeff on r 4: | −0.08431 |
| Coeff on r 6: | −0.00303 |
| Coeff on r 8: | 0.007703 |
| Coeff on r 10: | −0.00269 |
| Coeff on r 12: | 0.000354 |
| Coeff on r 14: | −1.35E−06 |
| Coeff on r 16: | −5.73E−07 |
| Aperture: | Floating Aperture |
| Maximum_Radius: | 2.15 |
| Stulace_13: | STANDARD_CG_(D263T) |
| Aperture: | FloatingAperture |
| Maximum_Radius: | 3 |
| Stulace_14: | STANDARD |
| Aperture: | Floating Aperture |
| Maximum_Radius: | 3 |
| Surface IMA: | STANDARD |

TABLE 8

Example Index of Refraction Data for Imaging Lens 1500

| Surf | Temp | Pres | 0.42 | 0.486 | 0.546 | 0.588 | 0.656 |
|---|---|---|---|---|---|---|---|
| 0 | 23.00 | 1.00 | 1.000000 | 1.000000 | 1.000000 | 1.000000 | 1.000000 |
| 1 | 23.00 | 1.00 | 1.000000 | 1.000000 | 1.000000 | 1.000000 | 1.000000 |
| 2 | 23.00 | 1.00 | 1.52-1.56 | 1.51-1.55 | 1.51-1.55 | 1.51-1.55 | 1.50-1.54 |
| 3 | 23.00 | 1.00 | 1.000000 | 1.000000 | 1.000000 | 1.000000 | 1.000000 |
| 4 | 23.00 | 1.00 | 1.65-1.69 | 1.63-1.67 | 1.61-1.65 | 1.61-1.65 | 1.60-1.64 |
| 5 | 23.00 | 1.00 | 1.000000 | 1.000000 | 1.000000 | 1.000000 | 1.000000 |
| 6 | 23.00 | 1.00 | 1.000000 | 1.000000 | 1.000000 | 1.000000 | 1.000000 |
| 7 | 23.00 | 1.00 | 1.52-1.56 | 1.51-1.55 | 1.51-1.55 | 1.51-1.55 | 1.50-1.54 |
| 8 | 23.00 | 1.00 | 1.000000 | 1.000000 | 1.000000 | 1.000000 | 1.000000 |
| 9 | 23.00 | 1.00 | 1.65-1.69 | 1.63.-1.67 | 1.61-1.65 | 1.61-1.65 | 1.60-1.64 |
| 10 | 23.00 | 1.00 | 1.000000 | 1.000000 | 1.000000 | 1.000000 | 1.000000 |
| 11 | 23.00 | 1.00 | 1.52-1.56 | 1.51-1.55 | 1.51-1.55 | 1.51-1.55 | 1.50-1.54 |
| 12 | 23.00 | 1.00 | 1.000000 | 1.000000 | 1.000000 | 1.000000 | 1.000000 |
| 13 | 23.00 | 1.00 | 1.51-1.55 | 1.50-1.54 | 1.50-1.54 | 1.50-1.54 | 1.50-1.54 |
| 14 | 23.00 | 1.00 | 1.000000 | 1.000000 | 1.000000 | 1.000000 | 1.000000 |
| 15 | 23.00 | 1.00 | 1.000000 | 1.000000 | 1.000000 | 1.000000 | 1.000000 |

Example Edge Thickness Data for Imaging Lens 1500

| Surf | Edge |
|---|---|
| OBJ | 1000000 |
| 1 | 1.259796 |
| 2 | 0.397955 |
| 3 | 0.160041 |
| 4 | 0.438 |
| 5 | 0.149003 |
| STO | 0.077164 |
| 7 | 0.353788 |
| 8 | 0.571348 |
| 9 | 0.609311 |
| 10 | 0.246279 |
| 11 | 0.585428 |
| 12 | 1.66473 |
| 13 | 0.3 |
| 14 | 0.105295 |
| IMA | 0 |

System Temperature: 23.0000 Celsius
System Pressure: 1.0000 Atmospheres
Absolute air index: 1.00027 at wavelength 0.546000 μm
Index data is relative to air system temperature and pressure.
Wavelengths are measured in air at the system temperature and pressure.

FIG. 16 illustrates graphs of field curvature correction and distortion for imaging lens 1500 depicted in FIG. 15, supra. The distortion graph reflects a radius mapping from an object to an image projected by imaging lens 1500 that has rotational symmetry or substantial rotational symmetry. More particularly, the mapping is non-linear as a function of Y position on a two-dimensional Y-Z coordinate axis that is co-planar with the image plane (and perpendicular to optical axis X of imaging lens 1500). As described herein, this distortion is designed for imaging lens 1500 to provide a field angle-dependent magnification that can expand an image near a center of the image (e.g., near Y=0 on the distortion graph) and compress the image near a periphery of the image (e.g., for increasing Y). In one aspect, the designed distortion can be within a range of about −40 percent to achieve a particular non-linear zoom magnification for imaging lens 1500. Furthermore, the designed distortion is specified in at least one aspect of the subject disclosure by imaging lens 1500 and the lens element and surface data provided by Tables 5-8, supra.

The left side graph of FIG. 16 illustrates field curvature for imaging lens 1500. The field curvature values are displayed for several wavelengths, including 0.420 μm, 0.486 μm, 0.546 μm, 0.588 μm and 0.656 μm. Field curvature for all wavelengths extends from −0.08 millimeters at Y=0 to about 0.05 millimeters for maximum Y (with respect to the displayed graph). Note that the field curvature of FIG. 16 is impacted by several design conditions of imaging lens 1500. For instance, the ratio TTL/$f$ can have an impact on field curvature, as well as the focal length conditions $f_1/f<0.876$, $f_1/f_{G1}<1.238$, $f_{G1}/f<0.707$, and $f_{G2}/f<0.77$. These conditions are generally met by the lens prescription data of Tables 5-8 pertaining to imaging lens 1500.

Figure 17:
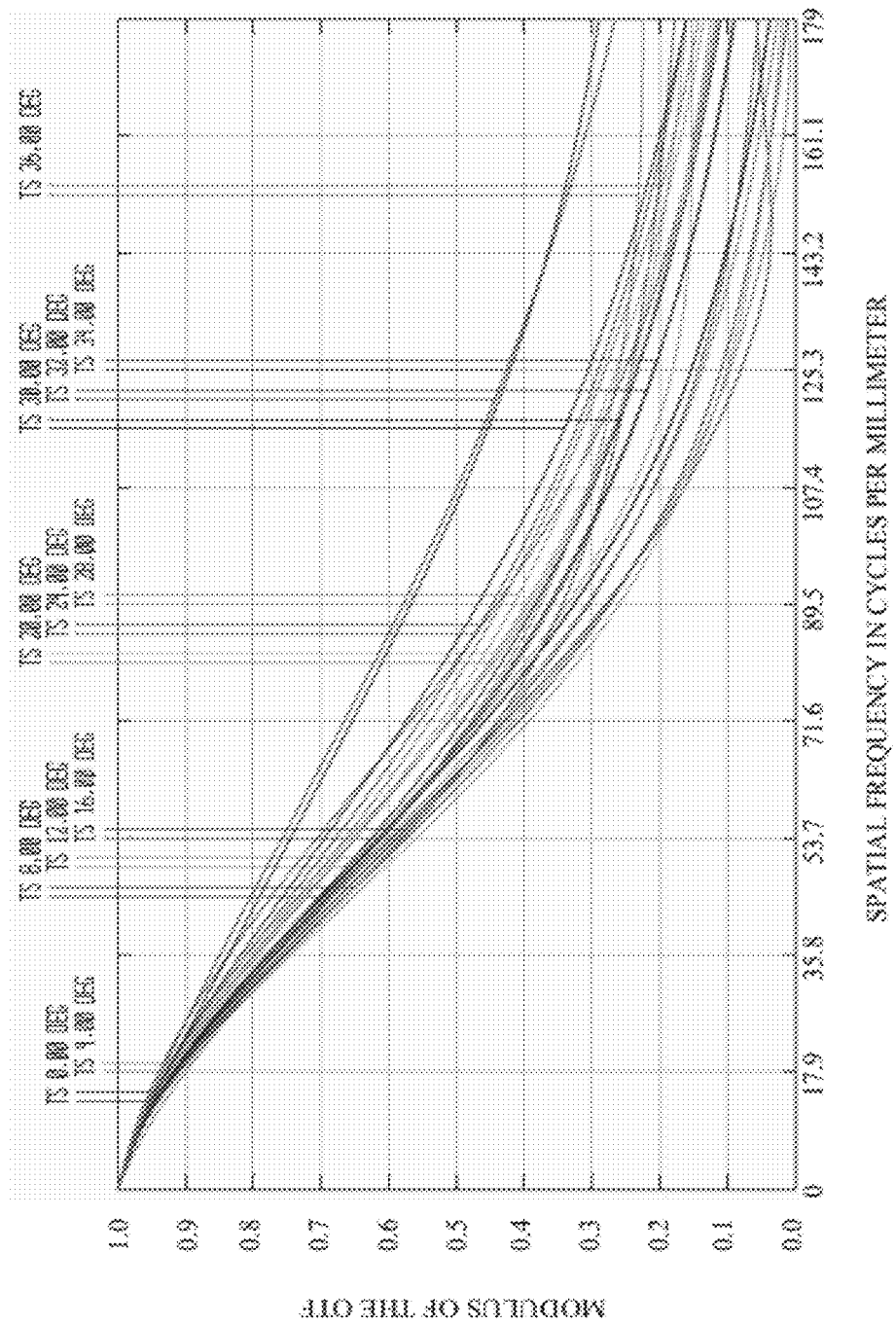
FIG. 17 depicts a graph of polychromatic diffraction MTF for an object distance of one meter.
Figure 18:
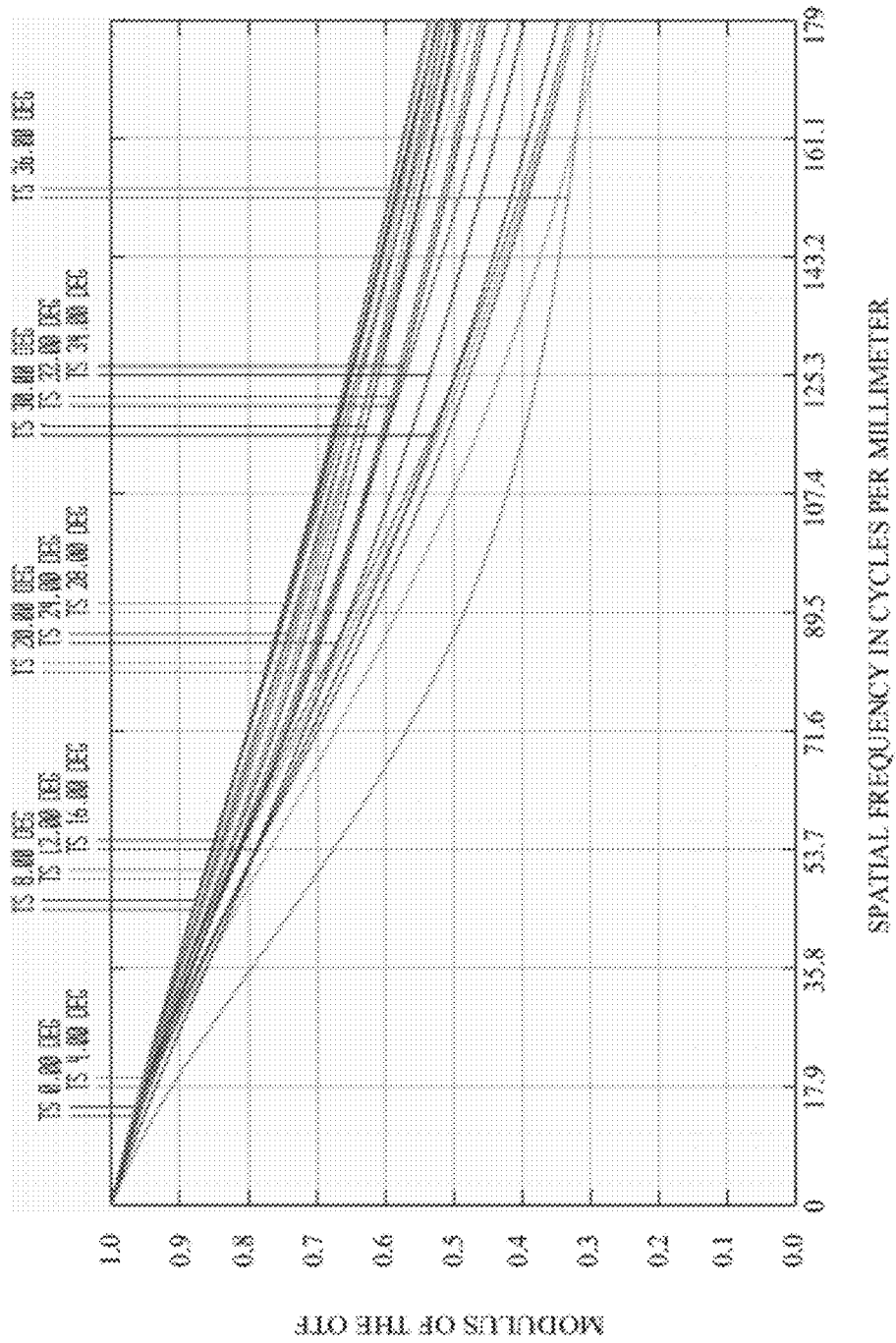
FIG. 18 illustrates a graph of polychromatic diffraction MTF for an object distance at infinity.

FIG. 17 illustrates a diagram of polychromatic diffraction modulation transfer function (MTF) for imaging lens 1500 according to another disclosed aspect. Particularly, the MTF is applicable for an object distance at 1000 mm. The vertical axis is a modulus of the optical transfer function (OTF), whereas the horizontal axis is listed in units of spatial frequency in cycles per millimeter. Further, respective curves of the MTF graph are for respective field angles, ranging from 0.00 degrees to 36.00 degrees in four degree increments. FIG. 18 illustrates a graph of polychromatic diffraction MTF for imaging lens 1500 at an object distance of infinity according to this aspect. The mild divergence in the curves of FIGS. 17 and 18 suggests that 1000 mm is a moderate far field approximation for imaging lens 1500. Said differently, an object at 1000 mm can be considered to be approaching an approximation of the far field for imaging lens 1500.

Figure 19:
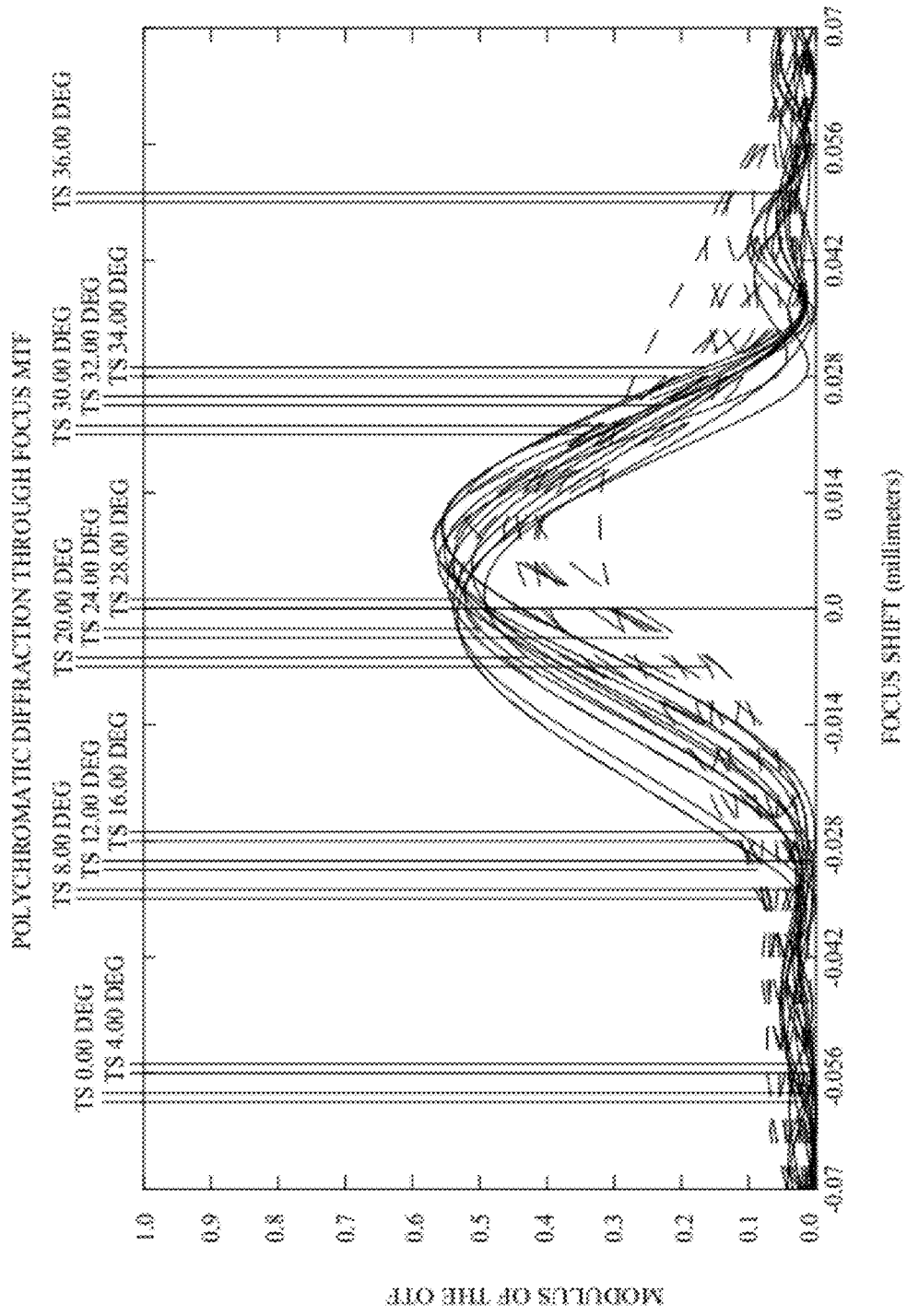
FIG. 19 depicts a graph of through focus MTF for the alternative zoom lens.

FIG. 19 illustrates a diagram of calculated polychromatic diffraction through focus MTF at a spatial frequency of 180 cycles per mm versus defocus distance (also in millimeters) for one aspect of the subject disclosure. As is depicted, the OTF is above about 0.3 for all field angles from 0.00 degrees to 30.00 degrees, indicating sufficient sharpness of the image projected by imaging lens 1500. Further, the OTF is above 0.5 for many field angles, providing a very good overall sharpness for the image.

Figure 20:
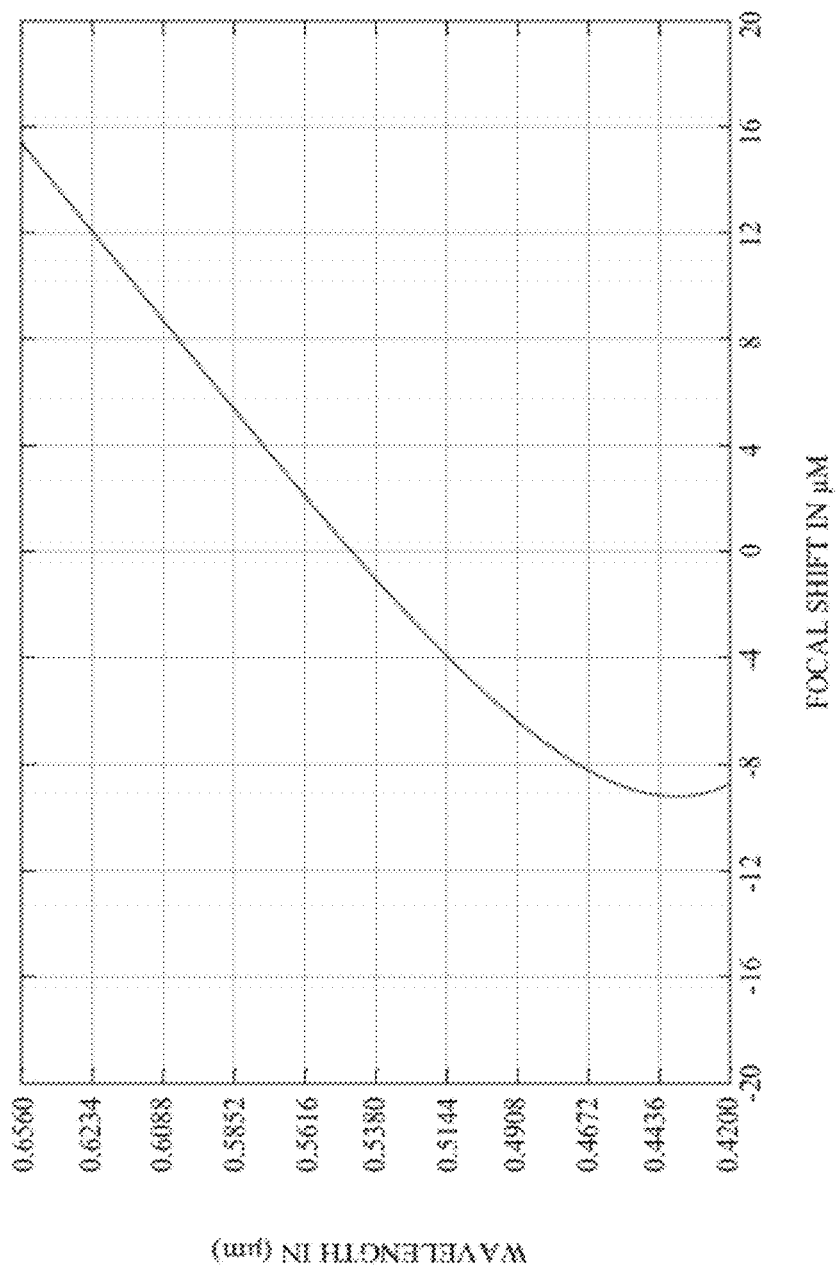
FIG. 20 illustrates a graph of chromatic focal shift for the alternative zoom lens in a particular disclosed aspect.

FIG. 20 depicts a diagram of chromatic focal shift for imaging lens 1500 according to at least one further aspect of the subject disclosure. The chromatic focal shift depicts focal shift in μm along a horizontal axis, for a range of wavelengths along a vertical axis. Specifically, the depicted wavelengths range from 0.4200 μm at the bottom to 0.6560 μm at the top of the vertical axis. As can be seen from the curve in the chromatic focal shift graph, focal shift ranges from just over −8 μm for blue light (∼0.4436 μm) to about 14 μm for red light (0.6560 μm). This yields a wavelength dependent focal shift of about 24 or less for the visible spectrum of light, indicating relatively minor chromatic aberration. In comparison, a chromatic focal shift of 60 μm or less is typically considered good for standard imaging lenses. Accordingly, imaging lens 1500 exhibits superior correction of chromatic aberrations in this particular aspect.

Figure 21:
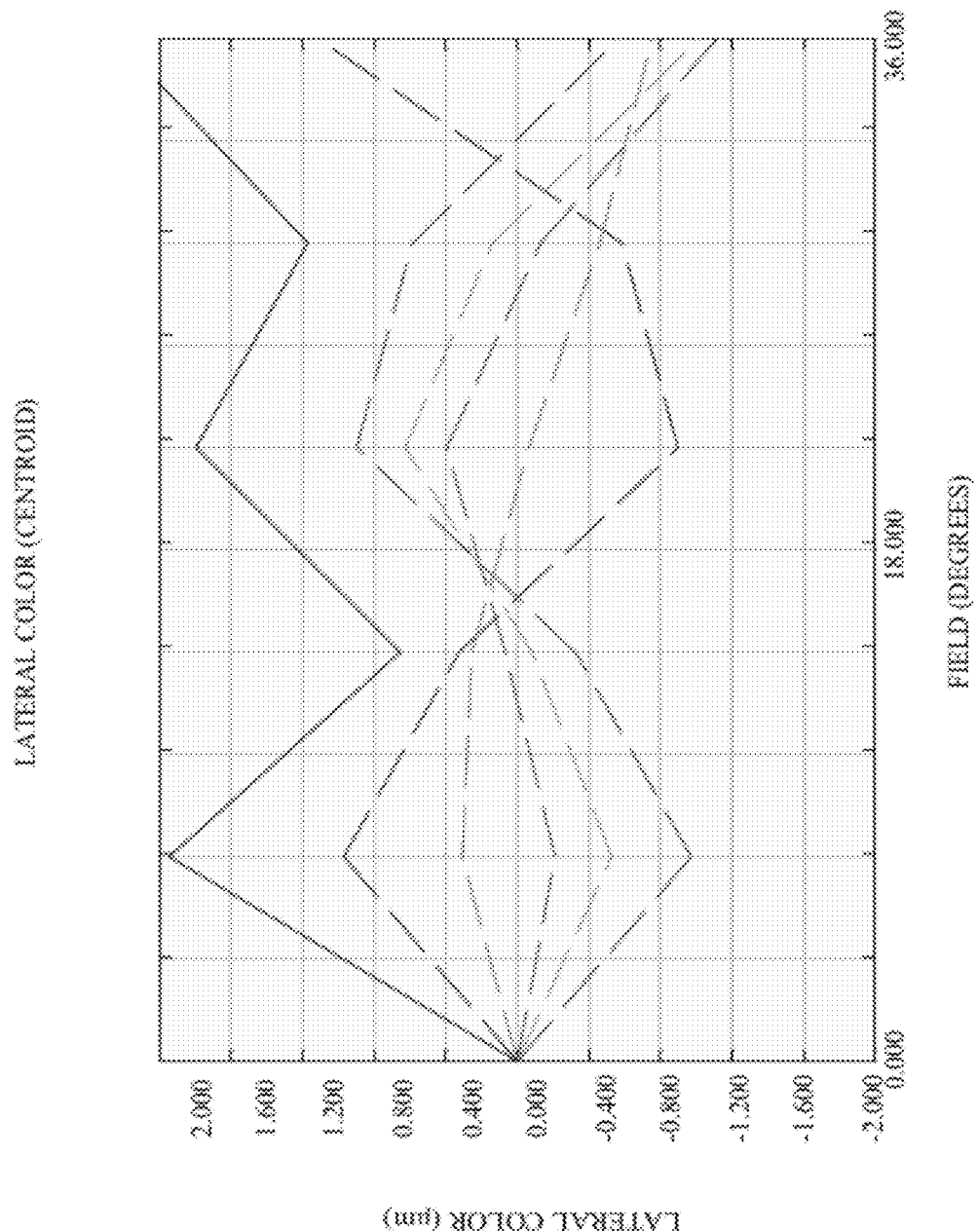
FIG. 21 depicts a graph of lateral color error for the alternative zoom lens in another aspect.

Further to the above, FIG. 21 depicts a diagram of lateral color error for imaging lens 1500 according to still other aspects of the subject disclosure. The lateral color error graph has a horizontal axis of field angles from 0.00 to 36.00 degrees, versus a vertical axis of lateral color in μm, ranging from −2.00 μm to 2.000 μm. The lateral color error of imaging lens 1500 is about a maximum of 2.5 μm, similar to a conventional imaging lens, providing good lateral color error correction.

As utilized herein, the word "exemplary" is intended to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. An optical imaging system for producing a real image of an object and having at least five lens elements arranged along an optical axis, comprising:

a first lens group having a combined refractive power that is positive, comprising at least:
   a first lens element having positive refractive power and a meniscus shape;
   a second lens element having negative refractive power and a meniscus shape;
   a third lens element having a convex shape on an object side surface at least near the optical axis;
   a rear lens group having a combined refractive power that is negative, comprising one or two of the at least five lens elements; wherein:
   the optical imaging system satisfies at least one of the following two conditional expressions:
   $f_1/f$<about 0.876 and $f_1/f_{G1}$<about 1.238; or
   $f_1/f$<about 1.27 and $f_1/f_{G1}$<about 1.12,
   where $f_1$ is a focal length of the first lens element, $f_{G1}$ is a combined focal length of the first lens group, and $f$ is a combined focal length of the optical imaging system.

2. The optical imaging system of claim 1, further satisfying the conditional expression TTL/$f$<1.136 where TTL is the total track length of the optical imaging system.

3. The optical imaging system of claim 1, further satisfying the conditional expression $f_{G1}/f$<0.707.

4. The optical imaging system of claim 1, further comprising satisfying the conditional expression $b_f/f$<0.162, where $b_f$ is a back focal length of the optical imaging system.

5. The optical imaging system of claim 1, further comprising satisfying the conditional expression $f_{G2}/f$<0.77, where $f_{G2}$ is a combined focal length of the rear lens group.

6. The optical imaging system of claim 1, further comprising satisfying the conditional expression TTL/$f$<about 1.56.

7. The optical imaging system of claim 1, further comprising satisfying the conditional expression $f_{G1}/f$<about 0.98.

8. The optical imaging system of claim 1, further comprising satisfying the conditional expression $f_{G2}/f$<about 9.36.

9. The optical imaging system of claim 1, further comprising satisfying the conditional expression $b_f/f$<about 0.155.

10. The optical imaging system of claim 1, wherein the optical imaging system comprises a non-linear magnification as a function of field angle that provides increased optical resolution information of at least a portion of the real image, and wherein the non-linear magnification is a result of a physical distortion of one or more surfaces of the lens elements.

11. The optical imaging system of claim 1, wherein the first lens group further comprises a fourth lens element having a small negative refractive power and a convex shape on an object side surface of the fourth lens element at least near the optical axis.

12. The optical imaging system of claim 1, wherein a convex surface of the first lens element is on an object side of the optical imaging system, and a convex surface of the second lens element is on the object side.

13. The optical imaging system of claim 1, wherein at least one optical surface of the first lens element is aspheric.

14. The optical imaging system of claim 13, wherein both optical surfaces of the second lens element, both optical surfaces of the third lens element, and both optical surfaces of the fourth lens element are aspheric.

15. The optical imaging system of claim 1, wherein the first lens element, the second lens element, the third lens element and the fourth lens element are formed from at least one plastic material.

16. The optical imaging system of claim 15, wherein the first lens element is formed of a first plastic.

17. The optical imaging system of claim 15, wherein the second lens element and the fourth lens element are formed of a second plastic.

18. The optical imaging system of claim 15, wherein the third lens element and a fifth lens element of the optical imaging system included in the rear lens group are formed of a third plastic.

19. The optical imaging system of claim 1, wherein an Abbe number of the second lens element subtracted from an Abbe number of the first lens element is greater than about 30.

20. The optical imaging system of claim 1, wherein an Abbe number of the fourth lens element subtracted from an Abbe number of the third lens element is greater than about 30.

21. The optical imaging system of claim 1, wherein the first lens element has a convex object-side surface and a concave image-side surface, the second lens element has convex object-side surface and a concave image-side surface, the third lens element is bi-convex, and wherein the rear lens group comprises at least a fourth lens element that has a convex object-side surface and a concave image side surface.

22. The optical imaging system of claim 1, wherein the optical imaging system is characterized by a full angle field of view between about 80 degrees and about 60 degrees.

23. The optical imaging system of claim 1, wherein the rear lens group comprises a fifth lens element of the optical imaging system.

24. The optical imaging system of claim 23, wherein opposing optical surfaces of the first lens element are aspheric and further wherein the third lens element has a small positive refractive power.

25. The optical imaging system of claim 24, wherein the fifth lens element has a negative refractive power, an object side optical surface that is concave at least near the optical axis, and an image side optical surface that is convex at least near the optical axis.

26. The optical imaging system of claim 23, wherein the fifth lens element has a varying optical power that is negative near a vertex of the fifth lens element and becomes positive at a radial distance from the vertex, and increasingly positive with increasing radial distance from the radial distance.

27. The optical imaging system of claim 1, further comprising an image sensor defining an image surface that receives the real image, and a post-processing filter that applies a digital correction to the non-linear magnification and that outputs a corrected real image.

28. The optical imaging system of claim 27, wherein the optical imaging system is a fixed-focus system that employs the non-linear magnification in conjunction with the digital correction to achieve optical magnification of at least a portion of the real image for the fixed-focus system.

29. The optical imaging system of claim 27, wherein the optical imaging system is a zoom focus system, and further wherein the zoom focus system focuses the real image onto the image sensor by at least one of:
  adjusting a position of the rear lens group on the optical axis relative the first lens group and the image sensor;
  adjusting a position of the image sensor on the optical axis relative the first lens group and the rear lens group; or
  adjusting a position of the rear lens group and the image sensor on the optical axis relative the first lens group.

30. The optical imaging system of claim 27, wherein the optical imaging system is characterized by a varying zoom magnification with a maximal magnification of 1.537 obtained at a center of the optical imaging system and that decreases with increasing half field of view, such that the varying zoom magnification is at least one of:
  substantially zero at substantially 11 degrees half field of view;
  less than 1 at half field of view angles above substantially 11 degrees; or
  substantially 0.7 at substantially 33 degrees half field of view.

31. The optical imaging system of claim 1, wherein the optical imaging system has an F number of less than about 3.2, and further wherein a through focus modulation transfer function (MTF) of the optical imaging system indicates an MTF contrast level of at least about 0.15 at a spatial frequency of about one-half of a Nyquist frequency of an imaging sensor associated with the optical imaging system, for an object at a predetermined object distance and the real image at a corresponding image distance to the predetermined object distances.

32. The optical system of claim 31, wherein the through focus MTF varies with image distance from a maximum value greater than about 0.5 at an image distance of infinity and decreases from the maximum value to a lower value that is greater than about 0.15 corresponding to an object distance of about 850 mm.

33. The optical imaging system of claim 1, wherein a refractive index of the first lens group and the rear lens group is within a range of about 1.5 to about 1.7, and an Abbe number of the first lens element, the third lens element and the rear lens group is between about 50 and about 60, and further wherein an Abbe number of the second lens element and the fourth lens element is between about 20 and about 30.

34. The optical imaging system of claim 1, wherein a maximum chromatic focal shift of the optical imaging system substantially within the range of visible light is about 20 micrometers.

35. The optical imaging system of claim 1, wherein a variance in lateral color of the optical imaging system is between about 2 and about 4 micrometers.

36. The optical imaging system of claim 1, wherein the first lens group comprises an aperture stop between the second lens element and the third lens element.

37. The optical imaging system of claim 1, wherein the first lens element, the third lens element and the rear lens group are made of a first plastic, and further wherein the second lens element and the fourth lens element are made of a second plastic different from the first plastic.

38. The optical imaging system of claim 1, wherein the optical imaging system further comprises a ratio of total track length (TTL) of the optical imaging system to an image circle diameter and a ratio of TTL of the optical system to a distorted image circle diameter that are at least one of:
  less than about 1.82 and less than about 1.92, respectively; or
  less than about 1.16 and less than about 1.22, respectively.

39. The optical imaging system of claim 1, wherein an Abbe number of the first lens element, the third lens element and the rear lens group is within a range from 53.00 to 57.00, and further wherein an Abbe number of the second lens element and the fourth lens element is within a range of 21.00 to 25.00.

40. The optical imaging system of claim 1, wherein the maximum chromatic focal shift across the visible light spectrum is about 24 micrometers.

41. A method for providing a miniature camera module for a hand-held device, comprising:
  receiving optical information regarding an object by employing at least four lens elements having a common optical axis;

forming a distorted real image of the object at an imaging surface having a non-constant magnification, wherein a portion of the real image has magnification greater than unity and a second portion of the real image has magnification less than unity; and wherein forming the distorted real image of the object further comprises generating an image circle diameter and distorted image circle diameter, wherein: a ratio of total track length (TTL) of the camera module to the image circle diameter and a ratio of TTL of the camera module to the distorted image circle diameter are at least one of: less than about 1.82 and less than about 1.92, respectively; or less than about 1.16 and less than about 1.22, respectively.

42. The method of claim 41, further comprising focusing the real image by adjusting a position of a subset of the at least four lens elements along the common optical axis relative to at least the imaging surface.

43. The method of claim 42, wherein the subset of the at least four lenses comprises a fifth lens element located along the optical axis between a fourth lens element and the imaging surface.

44. The method of claim 43, wherein focusing the real image further comprises adjusting a position of the imaging surface in conjunction with adjusting the position of the fifth lens element, wherein a distance between the fifth lens element and the imaging surface is held constant.

* * * * *